(12) United States Patent
Rollins

(10) Patent No.: US 8,345,540 B2
(45) Date of Patent: Jan. 1, 2013

(54) VIRTUAL SNOOPING BRIDGE IN COMPUTER NETWORKS

(75) Inventor: Michael T. Rollins, Santa Rosa, CA (US)

(73) Assignee: Calix, Inc., Petaluma, CA (US)

( * ) Notice: Subject to any disclaimer, the term of this patent is extended or adjusted under 35 U.S.C. 154(b) by 359 days.

(21) Appl. No.: 12/759,362

(22) Filed: Apr. 13, 2010

(65) Prior Publication Data

US 2011/0249551 A1 Oct. 13, 2011

(51) Int. Cl.
*H04L 12/26* (2006.01)
(52) U.S. Cl. .................. 370/222; 370/254; 370/432
(58) Field of Classification Search .............. 370/222, 370/216, 217, 254, 432; 380/270
See application file for complete search history.

(56) References Cited

U.S. PATENT DOCUMENTS

| | | | |
|---|---|---|---|
| 6,304,575 B1 | 10/2001 | Carroll et al. | |
| 6,956,852 B1 | 10/2005 | Bechtolsheim et al. | |
| 7,660,271 B2 | 2/2010 | Pang | |
| 7,688,849 B2 | 3/2010 | Rabie et al. | |
| 2005/0163102 A1 | 7/2005 | Higashitaniguchi et al. | |
| 2006/0146857 A1* | 7/2006 | Naik et al. | 370/432 |
| 2007/0230366 A1* | 10/2007 | Takatori | 370/254 |
| 2008/0025207 A1* | 1/2008 | Akahane et al. | 370/217 |
| 2009/0109841 A1 | 4/2009 | Nozaki et al. | |
| 2009/0168671 A1 | 7/2009 | Holness et al. | |
| 2009/0207726 A1* | 8/2009 | Thomson et al. | 370/216 |
| 2009/0268609 A1 | 10/2009 | Koch et al. | |
| 2009/0279701 A1* | 11/2009 | Moisand et al. | 380/270 |
| 2010/0226260 A1 | 9/2010 | Zinjuvadia et al. | |
| 2011/0261724 A1 | 10/2011 | Bulusu et al. | |
| 2011/0267983 A1 | 11/2011 | Ramanathan et al. | |
| 2012/0008635 A1 | 1/2012 | Kuo et al. | |

OTHER PUBLICATIONS

Deering, RFC 1112-Host Extensions for IP Multicasting, Network Working Group, Aug. 1989, 12 pages.
Fenner, RFC 2236-Internet Group Management Protocol, Version 2, Network Working Group, Nov. 1997, 17 pages.
Cain et al., RFC 3376-Internet Group Management Protocol, Version 3, Network Working Group, Oct. 2002, 37 pages.
Shah, RFC 3619-Extreme Networks' Ethernet Automatic Protection Switching, Network Working Group, Oct. 2003, 6 pages.
Christensen et al., RFC 4541-Considerations for Internet Group Management Protocol, Network Working Group, May 2006, 12 pages.
G.8032, Ethernet Ring Protection Overview, ITU-T Q9-SG 15, Mar. 2008, 23 pages.
802.1D, IEEE Standard for Local and Metropolitan Area Networks, Media Access Control (MAC) Bridges, Jun. 9, 2004, 281 pages. G.S. Antonova, "Spanning Tree Protocol Interoperability with Other Loop Prevention Algorithms," IEEE, 2007, pp. 1098-1101.
IEEE Standard for Local and metropolitan area networks, Media Access Control (MAC) Bridges, Amendment 1: Bridging of IEEE 802.17a, IEEE Std 802.17a-2004, Oct. 29, 2004, 11 pages.

* cited by examiner

*Primary Examiner* — Albert T Chou
(74) *Attorney, Agent, or Firm* — Fogg & Powers LLC

(57) ABSTRACT

In general, techniques are described for implementing a virtual snooping bridge in computer networks. The techniques may be implemented by a ring network comprised of a plurality of ring network devices arranged in a ring topology. In one aspect, a ring network device coupled to an adjacent device that provides access to multicast content implements the techniques. This ring network device comprises one or more ports and a control unit. The ports receive ring messages from one or more of the other ring network devices in accordance with a group management ring protocol (GMRP). The ring messages indicate operations requested by one or more host devices with respect to delivery of content of the multicast group. The control unit then presents the received operations to the adjacent network device such that, from the perspective of the adjacent network device, the ring network appears as a single layer two network device.

43 Claims, 16 Drawing Sheets

VIRTUAL SNOOPING BRIDGE IN COMPUTER NETWORKS

TECHNICAL FIELD

The disclosure relates to computer networks and, more particularly, to network devices that manage computer networks.

BACKGROUND

A computer network is a collection of interconnected computing devices that can exchange data and share resources. Often, in highly populated areas, the computer network is configured in a ring topology, where certain devices, referred to as "nodes," are interconnected via network links in the shape of a ring. A node may represent a switch or any other type of layer 2 (L2) network device. That is, each node couples via a separate network link to two adjacent node, one clockwise and the other counter-clockwise around the ring. When shaped in a ring, the network is referred to as a "ring network."

Generally, the nodes provide access to the ring network. The computing devices couple to the nodes to gain access to the ring network and thereby interconnect with other computing devices coupled to the ring network. The computing devices generate data, video and voice traffic and exchange this traffic with other computing devices via the interconnection provided by the ring network. The nodes forward the data traffic typically in a determined direction, e.g., clockwise or counter-clockwise, around the ring to facilitate the exchange. The ring network may provide generous geographical coverage due to its shape, which allows the ring network to reach computing devices dispersed over wide geographical areas. The ring network may be resilient in that it can forward data in both the clockwise and counter-clockwise directions to avoid a faulted link.

While providing generous geographical coverage and reasonable resilience, the ring network may suffer from traffic loops. For certain types of data that do not include a specific destination, such as multicast or broadcast data, for example, each of the nodes may simply forward this data around the ring to ensure each node forwards the ring to every computing device. If none of the nodes identifies that this data is looping the ring network, each node may continue to forward the traffic endlessly, thereby establishing a traffic loop, which may substantially impact the performance of the ring network by needlessly consuming network resources, such as node processing time and memory as well as link bandwidth.

To correct for traffic loops, some ring networks implement network management techniques. One such network management technique, for example, may designate one of the devices of the ring network as a master or control node, where the control node includes a primary port and a secondary port. The control node forwards traffic via the primary port and blocks traffic via the secondary port. Typically, the master device blocks the secondary port logically. In other words, the master device may actively filter traffic arriving via the secondary port, discarding or dropping certain traffic, such as data traffic, but allowing other traffic, such as control traffic used by the master device to monitor or otherwise control the ring network. In this way, the control node effectively prevents traffic from endlessly looping around the ring network. In some instances, such as when a fault occurs in the network, the control node needs to unblock the secondary port and redirects traffic around the ring to avoid the fault.

To detect the fault, the ring network generally implements a ring management protocol. In accordance with the ring management protocol, the transport nodes may, in some instances, detect a fault in a link adjacent to the nodes and send a message that conforms to a format specified by the ring management protocol to the control node. The message indicates that a fault has been detected. In other instances, the control node periodically generates and forwards a fault detection message, which is a type of control message, around the ring via the primary port in accordance with the ring management protocol. If the control node does not receive the fault detection message via the secondary port, receives the message indicating that a fault has been detected or detects a fault itself in a link adjacent to the control node, the control node determines that a fault has occurred and unblocks the secondary port. The control node then begins forwarding traffic via both the primary and secondary ports as the detected fault provides a break in the traffic loop. The remaining nodes of the ring network, commonly referred to as transport nodes, learn of the unblocked port by virtue of receiving the traffic forwarded from the secondary port of the control node and reconfigure the way in which they forward traffic to account for the fault and the unblocked port. While the ring network may effectively reconfigure itself in this manner to overcome network faults, often the reconfiguration disrupts delivery of the multicast and broadcast traffic, requiring those computing devices already joined to and receiving multicast traffic from a multicast group (which are generally referred to by convention as "host devices" or "multicast host devices") to re-request the multicast content via multicast control protocols.

SUMMARY

In general, this disclosure describes techniques that may allow a ring network having nodes deployed in a ring topology to appear as a single coherent snooping bridge to adjacent network devices with the result of reducing or potentially eliminating any disruption caused by the implementation of network management techniques to overcome faults in the ring network. For example, host devices coupled to the respective nodes of the network often subscribe to content of a multicast group by issuing join messages in accordance with an Internet group management protocol (IGMP). Rather than forward each and every join message to an adjacent network device external from the ring network that provides access to the content of the multicast group, the nodes of the ring network may determine first whether the requested content of the multicast group is already being delivered around the ring network.

If it is determined that the content is already being forwarded around the ring network, in some examples, the node of the ring network coupled to the requesting one of the host devices may begin to forward the requested content to the requesting one of the host devices without ever forwarding the join request to the adjacent network device. If it is determined that the content is not already being forwarded around the ring network, the node may forward the join message via the ring network to the adjacent network device to effectively join the entire ring network to the multicast group. Each of the other operations of IGMP or any other group management protocol may similarly be performed in the context of the ring network such that the ring network appears as a single snooping bridge to adjacent network devices.

By virtualizing the ring network in this manner such that an entire ring network appears as a single coherent snooping bridge or switch, the ring network may be able to reconfigure itself without the adjacent network device or any of the ring network devices learning of this reconfiguration. Considering that the ring network may converge after detecting a fault in seconds or even hundreds of milliseconds (if not less), the actual disruption may be limited to this convergence time instead of the potential disruption of minutes that may result in ring networks that do not implement the techniques described in this disclosure. Moreover, by presenting itself as a single snooping bridge acting as an IGMP proxy, the ring network may lessen the amount of message traffic sent over the ring network toward attached multicast routers and thereby lower the computational burden placed on these routers. For large networks having hundreds or thousands of devices connected to a large ring network, the techniques may greatly reduce the amount of message traffic and thereby significantly reduce or lower the computation burden placed on these routers.

In one aspect, a method comprises receiving, with one of a plurality of ring network devices configured in a ring topology to form a ring network, ring messages from one or more of the other ring network devices in accordance with a group management ring protocol, wherein the ring messages indicate operations requested by one or more host devices with respect to delivery of content of a multicast group, and wherein the one or more host devices are coupled to the ring network devices. The method also comprises presenting, with the one of the ring network devices, the requested operations to an adjacent network device such that, from the perspective of the adjacent network device, the ring network appears as a single layer two network device, wherein the one of the ring network devices couples directly to the adjacent network device, and wherein the adjacent network device provides access to the content of the multicast group.

In another aspect, a method comprises storing, with one of a plurality of ring network devices configured in a ring topology to form a ring network, data identifying at least one multicast group to which the ring network has joined, wherein the one of the plurality of ring network devices is indirectly coupled to an adjacent network device via one or more of the remaining plurality of ring network devices, receiving, with the one of the plurality of ring network devices, a ring message in accordance with a group management ring protocol (GMRP) implemented by each of the plurality of ring network devices so as to present the ring network as the single layer two network device to the adjacent network device, and performing, with the one of a plurality of ring network devices, operations in response to the ring message so as to enable each of the plurality of ring network device to present the ring network as a single layer two network device to the adjacent network device.

In another aspect, a ring network device directly coupled to an adjacent network device provides access to content of a multicast group. The ring network device comprises at least one port that receives ring messages from one or more other ring network devices in accordance with a group management ring protocol, wherein the ring messages indicate operations requested by one or more host devices with respect to delivery of content of the multicast group, wherein the one or more host devices are coupled to the plurality of ring network devices, and wherein the ring network device comprises one of a plurality of ring network devices that are configured in a ring topology to form a ring network and a control unit that presents the received operations to the adjacent network device such that, from the perspective of the adjacent network device, the ring network appears as a single layer two network device.

In another aspect, a ring network device indirectly coupled to an adjacent network device provides access to content of a multicast group. The ring network device comprises a control unit that stores data identifying at least one multicast group to which the ring network has joined, wherein the ring network device is one of a plurality of ring network devices, and wherein the ring network devices indirectly couples to the adjacent network device via one or more of the remaining plurality of ring network devices, and at least one port that receives a ring message in accordance with a group management ring protocol (GMRP) implemented by each of the plurality of ring network devices so as to present the entire ring network as the single layer two network device to the adjacent network device. The control unit performs operations in response to the ring message so as to enable each of the plurality of ring network devices to present the entire ring network as a single layer two network device to the adjacent network device.

In another aspect, an apparatus directly coupled to an adjacent network device provides access to content of a multicast group. The apparatus comprises means for receiving ring messages from one or more of the other ring network devices in accordance with a group management ring protocol, wherein the ring messages indicate operations requested by one or more host devices with respect to delivery of content of the multicast group, wherein the one or more host devices are coupled to the plurality of ring network devices, and wherein the ring network device comprises one of a plurality of ring network devices that are configured in a ring topology to form a ring network and means for presenting the received operations to an adjacent network device such that, from the perspective of the adjacent network device, the ring network appears as a single layer two network device.

In another aspect, computer-readable storage medium comprising instructions that cause a processor to receive, with one of a plurality of ring network devices configured in a ring topology to form a ring network, ring messages from one or more of the other ring network devices in accordance with a group management ring protocol, wherein the ring messages indicate operations requested by one or more host devices with respect to delivery of content of a multicast group, and wherein the one or more host devices are coupled to the plurality of ring network devices and present, with the one of the plurality of network devices, the received operations to an adjacent network device such that, from the perspective of the adjacent network device, the ring network appears as a single layer two network device, wherein the one of the plurality of network devices couples directly to the adjacent network device, and wherein the adjacent network device provides access to the content of the multicast group.

In another aspect, a computer-readable storage medium comprising instructions that cause a processor to store, with one of a plurality of ring network devices configured in a ring topology to form a ring network, data identifying at least one multicast group to which the ring network has joined, wherein the one of the plurality of ring network devices is indirectly coupled to an adjacent network device via one or more of the remaining plurality of ring network devices, receive, with the one of the plurality of ring network devices, a ring message in accordance with a group management ring protocol (GMRP) implemented by each of the plurality of ring network devices so as to present the entire ring network as the single layer two network device to the adjacent network device and perform, with the one of a plurality of ring network devices, operations in response to the ring message so as to enable each of the plurality of ring network device to present the entire ring network as a single layer two network device to the adjacent network device.

In another aspect, a network system comprises a plurality of ring network devices configured in a ring topology to form a ring network, an adjacent network device coupled to one of the plurality of ring network devices that is external from the ring network, wherein the adjacent network device provides access to content of a multicast group, and one or more host devices coupled to one or more of the plurality of ring network devices that are external from the ring network. The one of the plurality of ring network devices directly coupled to the adjacent network device comprises at least one port that receives ring messages from one or more other ring network devices in accordance with a group management ring protocol (GMRP), wherein the ring messages indicate operations requested by one or more host devices with respect to delivery of content of the multicast group and a control unit that presents the received operations to the adjacent network device such that, from the perspective of the adjacent network device, the ring network appears as a single layer two network device. Each of the other ring network devices that indirectly couple to the adjacent network device comprise a control unit that stores data identifying at least one multicast group to which the ring network has joined and at least one port that receives the ring messages in accordance with the group management ring protocol (GMRP) implemented by each of the plurality of ring network devices so as to present the entire ring network as the single layer two network device to the adjacent network device. The control unit of the indirectly coupled ring network devices performs other operations in response to the ring messages so as to enable each of the plurality of ring network devices to present the entire ring network as a single layer two network device to the adjacent network device.

The details of one or more aspects of the disclosure are set forth in the accompanying drawings and the description below. Other features, objects, and advantages will be apparent from the description and drawings, and from the claims.

DETAILED DESCRIPTION

Figure 1:
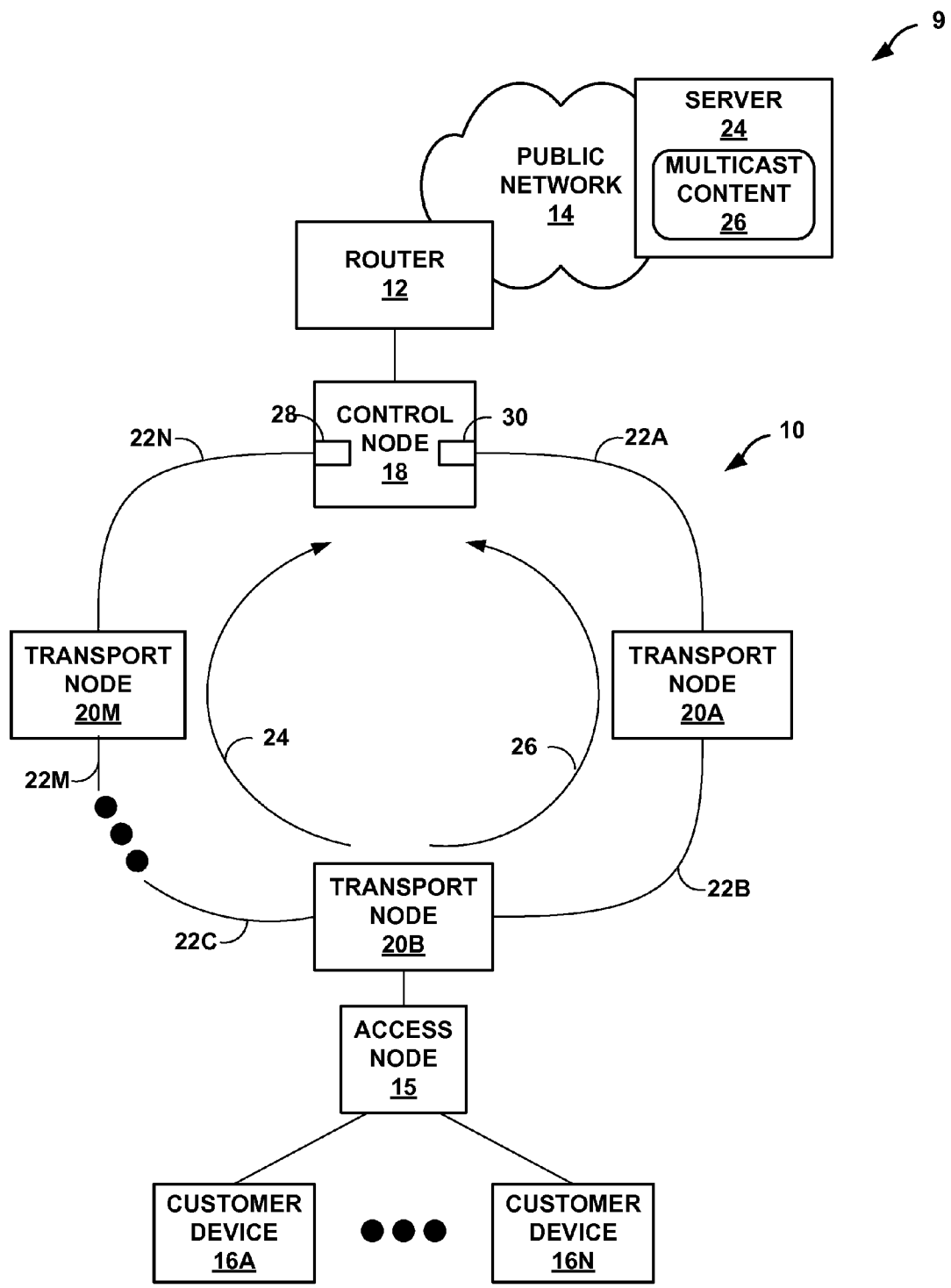
FIG. 1 is a block diagram illustrating an example network system including a ring network that implements virtual snooping bridge techniques described in this disclosure.

This disclosure generally describes techniques that allow a ring network having nodes deployed in a ring topology to appear as a single snooping bridge to adjacent network devices with the result of reducing or potentially eliminating any disruptions caused by the implementation of network management techniques to overcome faults in the ring network. Commonly, a node of the ring network is configured as a master or control node that implements a ring management protocol for detecting faults, such as a failed node or link in the ring network. To implement the ring management protocol, the control node is configured to support one or more data virtual local area networks (VLANs) that traverse each of the remaining nodes of the ring network and a control VLAN for controlling delivery of traffic via the one or more data VLANs. The remaining nodes are generally referred to as transport nodes, where the term "node" generally represents any layer two (L2) network device, such as a switch, a hub, a gateway, an optical line terminal (OLT), an optical node terminal (ONT), a cable termination system (CMTS), and a digital subscriber line access multiplexer (DSLAM).

The control node includes a primary port and a secondary port and is configured to logically block traffic arriving via the one or more data VLANs on the secondary port. The term "logical blocking" generally refers to filtering or dropping of the data traffic. The control node generates and forwards a fault detection message periodically around the ring via the primary port in accordance with the ring management protocol. If the control node receives the fault detection message on the secondary port, the control node determines that there are no faults in the network. However, if the control node does not receive the fault detection message within a set amount of time, the control node determines that a fault has occurred and unblocks the secondary port to permit data traffic to be forwarded both via the primary port and the now unblocked secondary port.

The control node may also detect faults itself in adjacent links or ring network devices to which the control node directly couples and unblock the secondary port in the manner described above. Further, transport nodes may detect faults in adjacent links or ring network devices to which the respective transport nodes directly couple and generate and forward a fault report message to the control node. In response to this fault report message, the control node effectively detects the fault and unblocks the secondary port in the manner described above. Generally, the ring network requires on the order of a hundred milliseconds to recover from a fault detected in many of the ways described above using the ring management protocol and once again re-establish full connectivity to all of the nodes around the ring network.

While nodes may require relatively small amounts of time to re-converge on network connectivity, the connectivity disruption around the ring network may require that each of the nodes updates its learning tables (which are sometimes referred to as "learning bridges") to reflect the unblocked secondary port and the presence of the fault in the network. In some instances, updates to the learning bridges may disrupt various network protocols that nodes of the ring network support to provide various services, such as an Internet group management protocol (IGMP) supported by the nodes to provide content of multicast groups to respectively coupled host devices. That is, IGMP maintains its own learning tables on each node referred to as multicast membership tables that need to be reconfigured to account for the unblocking of the ports and the detected fault, which can cause significant delays on the order of minutes. Typically, the node supports IGMP to facilitate their respectively coupled nodes access to multicast content, such as video data or streams.

For example, host devices coupled to the respective nodes of the network often subscribe to content of a multicast group by issuing join messages in accordance with IGMP. Rather than forward each and every join message to an adjacent network device external from the ring network that provides access to the content of the multicast group, the nodes of the ring network determine first whether the requested content of the multicast group is already being delivered around the ring network. If it is determined that the content is already being forwarded around the ring network, the node of the ring network coupled to the requesting one of the host devices begins to forward the requested content to the requesting one of the host devices without ever forwarding the join request to the adjacent network device. If it is determined that the content is not already being forwarded around the ring network, the node forwards a join ring message in accordance with a group management ring protocol (GMRP) around the ring network to the one of the ring network devices coupled to the adjacent network device.

In some instances, one of the ring network devices discovers the adjacent network device usually by receiving an IGMP message from that adjacent network device. The node that forwards the join ring message may not be able to identify this one of the ring network devices coupled to the adjacent network device, but by forwarding the join ring message around the ring network, this one of the ring network devices receives this join ring message.

In either instance, this one of the ring network device then generates an IGMP join message based on the GMRP join ring message and forwards this IGMP join message to the adjacent network device. The GMRP join ring message is forwarded all the way around the ring to establish a forwarding path around the ring by which to send content of the joined multicast group, which is received after sending the IGMP join message to the adjacent network device. By installing this forwarding path for the multicast content of the joined multicast group all the way around the ring network, the entire ring network effectively represents the way in which a single switch or bridge would install a forwarding path. The multicast connection is made in both directions around the ring. GRMP takes advantage of the underlying ring management control protocols ability to block the ring data path and thus avoids a looping of the multicast traffic while simultaneously providing a redundant multicast path that potentially speeds convergence in the event of a ring fault. By presenting the IGMP join message to the adjacent network device only if the entire ring network has not joined the multicast group, the techniques present the entire ring network to the adjacent network device as a single switch or bridge. Each of the other operations of IGMP or any other group management protocol may similarly be performed in the context of the ring network such that the ring network appears as a single snooping bridge to adjacent network devices.

By virtualizing the ring network in this manner such that an entire ring network appears as a single snooping bridge or switch, the ring network is able to reconfigure itself without the adjacent network device or any of the host devices learning of this reconfiguration. In a sense, the ring network uses the techniques of this disclosure to internalize ring network faults and reduce or, in some instances, eliminate detection of the ring network faults by external devices via network protocols, such as IGMP. Considering that the ring network converges after detecting a fault in seconds or even hundreds of milliseconds (if not less), the actual disruption is limited to this convergence time instead of the potential disruption of minutes that may result in ring networks that do not implement the techniques described in this disclosure. Moreover, by presenting itself as a single snooping bridge acting as an IGMP proxy, the ring network may lessen the amount of message traffic sent over the ring network toward attached multicast routers and thereby lower the computational burden placed on these routers. For large networks having hundreds or thousands of devices connected to a large ring network, the techniques may greatly reduce the amount of message traffic and thereby significantly reduce or lower the computation burden placed on these routers.

FIG. 1 is a block diagram illustrating an example network system 9 including a ring network 10 that implements the virtual snooping bridge techniques described in this disclosure. As shown in the example of FIG. 1, network system 9 includes a ring network 10, a router 12 that facilitates access to a public network 14 (e.g., the Internet), access node 15, and customer devices 16A-16N ("customer devices 16"). While described with respect to a ring network 10, the techniques may be implemented with respect to any type of network that implements management protocols to prevent traffic loops to reduce or potentially eliminate disruptions with respect to other network protocols caused by rerouting traffic to overcome traffic faults.

Ring network 10 includes a control or master node 18 ("control node 18"), transport nodes 20A-20M ("transport nodes 20"), and links 22A-22N ("links 22"). Nodes 18, 20 each represent layer 2 (L2) network devices, such as a switch, hub, gateway, or any other type of L2 network device. While described with respect to L2 network devices, the techniques may apply to L3 or any other type of network device capable of receiving and forwarding or otherwise switching network traffic. Ring network 10 may be referred to as a ring network in that nodes 18, 20 are arranged in a ring topology such that each of nodes 18, 20 couple to two other ones of nodes 18,20 via two different one of links 22 in both a clockwise and counterclockwise direction. For example, control node 18 is coupled to transport node 20A via link 22A, transport node 20A is coupled to transport node 20B via link 22B, and so on, completing the ring with transport node 20M coupled to control node 18 via link 22N.

In the example of FIG. 1, control node 18 couples to router 12 that represents an adjacent network device external from ring network 10. While shown in the example of FIG. 1 as coupling to router 12, control node 18 need not directly couple to router 12 to properly implement aspects of this disclosure. That is, control node 18 may not directly couple to router 12 while one of transport nodes 20 does couple directly to router 12. The fault detection and other ring management protocol functionality is still implemented and provided by control node 18, while the one of transport nodes 20 interacts with the adjacent network device, e.g., router 12, in a manner that presents the entire ring network as an snooping bridge. The techniques are described with respect to control node 18 for ease of illustration purposes, but should not be limited in this respect.

Router 12 is one example of such an external adjacent network device. Router 12 generally facilitates access to public network 14, which as noted above may represent the Internet or any other publically accessible computer network. Router 12 implements L3 network protocols to route or otherwise establish and maintain forwarding paths through public network 14 to each and every accessible destination within public network 14. While described with respect to router 12, the techniques described in this disclosure may be implemented with respect to any adjacent network device that is external from ring network 10 and provides access to multicast content associated with any given multicast group.

In the example of FIG. 1, router 12 provides access to server 24 located within public network 14 that stores and serves multicast content 26 associated with a multicast group. Server 24 represents a network device capable of servicing requests for content such as multicast content 26. Server 24 may be referred to as a "multicast server 24" as a result of serving multicast content 26. Multicast content 26 represents any type of data that can be delivered via association with the multicast group, such as video data, audio data, image data or any other type of data commonly sent via association with a given multicast group.

As further shown in the example of FIG. 1, transport node 20B couples to an access node 15. Access node 15 represents a network device that facilitates access to ring network 10 and thereby to public network 14, such as a Digital Line Subscriber Line Access Multiplexer (DSLAM), a Cable Termination System (CMTS), an Optical Line Terminal (OLT), or other broadband service transport and/or aggregation network devices. Additional examples of transport and/or aggregation network devices include the Calix C7 Multiservice Access Platform and the Calix E5 Multiservice Ethernet Service Platform, commercially available from Calix Networks, Inc., of Petaluma, Calif. In any event, access node 15 generally manages access by one or more of customer devices 16, which may represent examples of the many types of devices used to connect to a network.

For example, customer devices 16 may include hardware devices such as, but not limited to, a cable, a digital subscriber line (DSL), and/or an optical network terminal (ONT), a wireless access point (WAP), a desktop computer, a laptop computer, a so-called "netbook," a mobile or cellular phone (including so-called "smart phones"), an IP-capable set-top box (STB), a personal digital assistant (PDA), a slate or tablet computer, a workstation or any other type of network device capable of accessing a network. Customer devices 16 generally represents one example of a multicast host device or host device as referenced to in the below incorporated RFC 2236, entitled "Internet Group Management Protocol, Version 2." The techniques described in this disclosure may be implemented with respect to any host device or multicast host device and should not be limited in this respect to exemplary customer devices 16 as shown in the example of FIG. 1.

While described above with respect to an exemplary network topology that positions access nodes, such as access node 15, as an intermediate network device between transport nodes, such as transport node 20B, and customer devices, such as customer devices 16, the techniques may apply to other exemplary network topologies, such as those that do not feature an intermediate network device and instead couples customer devices 16 directly to transport nodes 20. Consequently, the techniques described in this disclosure should not be limited to any one of the exemplary network topologies described in this disclosure.

In addition, while only transport node 20B is shown coupling to an access node 15 for ease of illustration purposes, each of nodes 18, 20 generally couple to a respective set of one or more access nodes, each of which are substantially similar to access node 15. Each of these access nodes then further couple to respective sets of one or more customer devices that are substantially similar to customer devices 16. To the extent the example of FIG. 1 does not show these additional devices for ease of illustration purposes, the techniques should not be limited in this respect.

In general, exemplary ring network 10 may be configured to provide a wide area network (WAN) or a metropolitan area network (MAN). Ring network 10, because it services two or more customer devices 16, may be referred to as a "backbone" network, in that ring network 10 provides a backbone to support the exchange of traffic between customer devices 16. Typically, to support the high level of data traffic often found on backbone networks, links 22 may comprise optical fiber links to facilitate the rapid transfer of the traffic around ring network 10.

The ring topology of ring network 10 may offer generous geographic coverage and resilience. That is, ring network 10 may reach customer devices 16 dispersed over wide geographic areas. Ring network 10 also provides resilience in that traffic may be forwarded in both a clockwise direction 24 and counterclockwise direction 26 around ring network 10. By enabling both directions of forwarding, transport nodes 20 may forward traffic so as to avoid one of links 22 that has failed, while still reaching every one of the transport nodes 20 and control node 18.

To detect faults, nodes 18, 20 are first configured in a manner that defines a logical grouping of nodes that are subject to a management protocol. This logical grouping is generally denoted as one or more data virtual local area networks (VLANs). These data VLAN are then subject to a control VLAN formed in accordance with a ring management protocol, such as IEEE 802.17 Resilient Packet Ring Protocol, Rapid Ring Protection Protocol, Resilient Ethernet Protocol, ITU G.8032 and Ethernet Automatic Protection Switching (EAPS) as outlined in request for comments (RFC) 3619. Another ring management protocol is described in pending U.S. patent application publication number 2009/0268609 A1, entitled "Efficient Management of Ring Networks," and published Oct. 29, 2009, the entire contents of which are hereby incorporated by reference as if fully set forth in its entirety herein.

One of the nodes 18, 20, i.e., control node 18 in this example, is then designated as a control node responsible for managing the data VLANs using the control VLAN. Control node 18 routinely or periodically issues a fault detection message via the control VLAN to detect any faults in the ring path. If control node 18 receives the fault detection message within a set amount of time, meaning that the fault detection message successfully traveled around ring network 10, control node 18 determines that no faults are present in the controlled data VLANs around ring network 10. If control node 18 does not receive the fault detection message within a set amount of time, control node 18 determines that there is a fault present in the controlled data VLANs around ring network 10.

Alternatively, control node 18 may detect a fault in one of links 22 adjacent to control node 18, e.g., links 22A, 22N. Transport nodes 20 may also detect a fault in one of links 22 adjacent to each of respective transport nodes 20. If one of transport nodes 20 detects the fault, this one of transport nodes 20 generates and forwards a ring fault report message to control node 18 in accordance with the ring management protocol. The ring fault report message indicates to control node 18 that a fault has been detected, effectively enabling control node 18 to detect the fault.

In response to detecting the fault in any one of the above noted ways, control node 18 unblocks a previously blocked port. That is, control node 18 generally includes a primary port 28 and a secondary port 30. Control node 18 blocks secondary port 30 usually logically through filtering or dropping of network traffic that arrives via the data VLANs. Control node 18 however generally does not block the control VLAN and control traffic may be permitted to flow both into and out of secondary port 30. Control node 18 blocks secondary port 30 to prevent traffic loops as certain types of traffic, such as multicast and broadcast traffic, may endlessly loop around ring network 10 without some break in the ring or loop of ring network 10. The reason these types of traffic may endlessly loop is that, within L2 protocols, such as the Ethernet protocol, multicast and broadcast traffic is automatically forwarded to all nodes within a given network but is never removed as these protocols assume some other network protocol ensures that loops are not present in the network. In the context of ring networks, the ring management protocol is the network protocol that ensures no loops are formed by blocking secondary port 30 of control node 18.

In any event, upon detecting a fault in ring network 10, control node 18 unblocks secondary port 30 to ensure connectivity to all nodes 18, 20 to each other of nodes 18, 20 leaving the fault to break traffic loops. Control node 18 may continue to send these fault detection messages to detect when the fault has been resolved. Upon receiving one of these fault detection messages via its secondary port 30 within the time limit, control node 18 determines that the fault has been resolved and once again blocks or re-blocks secondary port 30 so as to once again prevent traffic loops. The ring management protocol is not generally very complex relative to other traffic-loop prevention protocols and therefore may converge on network connectivity on the order of a hundred or so milliseconds if not sooner.

Commonly, L2 network devices, such as nodes 18, 20, converge on connectivity through a form of learning whereby L2 addresses are mapped to ports, either logical or physical, for purposes of switching traffic. Each of these nodes 18, 20 include, as one example, a table that defines a learning bridge and which has entries defining the above noted mappings between L2 addresses and ports. In some example, nodes 18, 20 maintain a separate table for each VLAN. In the context of nodes 18, 20 of ring network 20, for example, control node 18 may store an entry in the learning table that defines a mapping between the port that couples control node 18 to router 12 and L2 media access control (MAC) addresses reachable via the particular port. Control node 18 may also store an entry in the learning table for the data VLANs and control VLANs that maps primary port 28 to the MAC addresses assigned to transport nodes 20 reachable from primary port 28. Likewise, control node 18 stores an entry in the learning table for control VLANs that maps secondary port 30 to the MAC addresses assigned to transport nodes 20 from which it received control traffic. In this sense, each of nodes 18, 20 converges on network connectivity and learns the topology of network system 9. In response to detecting a fault, all of these learning tables stored by nodes 18, 20 need to be updated to reflect the change in connectivity around ring network 10 caused by unblocking secondary port 30 and the presence of the fault.

This relearning often leads to a number of difficulties with respect to varying network protocols, despite the fact that ring network 10 normally relearns and thereby converges on connectivity usually in a matter of tens or hundreds of milliseconds. One such protocol widely used in network that may be affected through these type of disruptions is the Internet group management protocol (IGMP). IGMP is a protocol by which client devices 16 manage memberships to multicast groups to access multicast content, such as multicast content 26, associated with the multicast groups. More information regarding IGMP can be found in RFC 2236, entitled "Internet Group Management Protocol, Version 2," dated November 1997, which is herein incorporated by reference in its entirety as if set forth fully herein.

In accordance with the techniques described in this disclosure, ring network 10 implements a group management ring protocol that enables ring network 10 to present itself as a single snooping bridge or switch device to those devices external from ring network 10, such as router 12, access device 15 and customer devices 16. Each of nodes 18, 20 implement the group management ring protocol to exchange multicast group information with one another. This information enables each of nodes 18, 20 to determine whether or not each of nodes 18, 20 should join, leave or perform any other operation on behalf of the virtual snooping bridge/switch presented to adjacent network devices 12, 15, 16.

By presenting itself in this manner, ring network 10 effectively internalizes fault detection and connectivity re-convergence after fault detection so that these external devices 12, 15 and 16 are for the most part unaware of any disruptions caused by the fault and successive relearning. Typically, by virtue of implementing the techniques of this disclosure, ring network 10 configures multicast paths in both directions around the ring. As a result, ring network 10 provides multicast content in such a manner that users who consume multicast content 24 see at most, in the event ring network 10 detects and re-converges from a fault, tiling of video data instead of having the video data dropped only to wait a minute or even more for customer devices 16 to rejoin the multicast group providing multicast content 24 because the multicast path is set in both directions around ring network 10.

To illustrate, control node 18 implements the techniques to receive ring messages from one or more of transport nodes 20 in accordance with the group management ring protocol (GMRP). The ring messages indicate operations requested by one or more customer devices 16 with respect to delivery of content 26 of the multicast group. Control node 18 presents the received operations to router 12 such that, from the perspective of router 12, ring network 10 appears as a single L2 network device, e.g., a snooping bridge or switch.

For example, customer device 16A may generate and forward an IGMP join message requesting to join the multicast group that provides multicast content 26. Access node 15 receives this IGMP join message and forwards it to transport node 20B. Rather than immediately forward IGMP join message to control node 18 for delivery to router 12, which represents the only adjacent network device in the example of FIG. 1 that provides access to multicast content 26, transport node 20B first determines whether the content is already being provided by ring network 10. In some instances, one of customer devices 16 coupled to any one of transport nodes 20 may have previously requested to join the multicast group that provides multicast content 26. In this instance, router 12 already provides multicast content 26 to control node 18, which sends this multicast content 26 around ring network 10 such that each of nodes 18, 22 receives this traffic. That is, control node 18 may have previously established the multicast path for this multicast content in both directions around ring network 10 such that multicast content 26 is received by each of nodes 18, 22. Control node 18, as noted above, terminates any traffic loops that may arise through such types of forwarding by blocking secondary port 30.

If transport node 20B determines that the requested multicast content is already being provided around ring network 10, transport node 20B updates data it stores to define device-specific multicast memberships in contrast to data it stores to define ring-specific multicast memberships. Transport node 20B may update this device-specific membership data to install a forwarding path so that transport node 20B forwards the content to requesting customer device 16A. Alternatively, if transport node 20B determines that the requested multicast content is not already being provided around ring network 10, transport node 20B generates a join ring message in accordance with GMRP based on the IGMP join message and outputs this join ring message around ring network 10 via the control VLAN. Upon receiving this join ring message, each of the remaining ones of transport nodes 20 and control node 18 update tables or other data structures to reflect that transport node 20B is joining the multicast group that provides multicast content 26. In this way, the multicast path for this multicast traffic is established in both directions around ring network 10. In response to the GMRP join ring message, control node 18 generates an IGMP join message based on the GMRP join ring message and outputs this IGMP join message to the adjacent network device, i.e., router 12 in this example.

In this sense, GMRP provides a means by which a plurality of network devices may communicate with one another to both install forwarding paths similar to those installed by a snooping bridge or switch and thereby facilitate the appearance of this virtual snooping bridge by ring network 10 to router 12. Moreover, GMRP installs these forwarding paths in both directions in advance of any ring faults. By installing these paths in both directions around the ring network, the reconfiguration of ring network 10 to account for detected faults does not usually disrupt delivery of the multicast traffic in a substantial manner. In some aspects, ring network 10 can be considered a virtual switch or bridge where each of nodes 18, 22 represent virtualized physical ports of the virtual switch or bridge. The group management ring protocol represents a way by which these separate "ports" communicate information regarding IGMP connectivity to one another and thereby facilitate the virtualization of ring network 10 with respect to adjacent devices external from the ring.

With respect to the example of IGMP, nodes 18, 20 may execute GMRP to communicate with one another so as to respond to IGMP messages sent both by router 12 and customer devices 16 as if ring network 10 represents a single L2 snooping bridge or switch. GRMP may provide for a number of different ring message formats to accommodate these communications. These communications, as well as, the message formats are described in more detail below with respect to FIGS. 3A-3D, 4, 5A-5B, 6A-6B and 7A-7E.

In response to control node 18 detecting a fault using the ring management protocol, control node 18 unblocks secondary port 30 and nodes 18, 20 begin relearning the flow of traffic and particularly the association with ports and MAC addresses in the presence of unblocked secondary port 30 and the fault. Yet, because convergence is relatively fast and commonly does not present a large disruption, especially considering that the multicast path is configured bi-directionally around the ring, none of nodes 18, 22 generally indicate this disruption to any of adjacent devices 12, 15, 16. Instead, ring network 10 recovers from the fault and re-converges on full network connectivity without removing or otherwise causing these adjacent network devices to detect the disruption, effectively internalizing the disruption. As these adjacent network devices are unaware of the relearning and internal disruption, router 12, access node 15 and customer devices 16 continue to wait while ring network 10 resolves the disruption, which as noted above, usually takes on the order of tens or hundreds of milliseconds. This is a minor disruption that normally only results in a very slight delay in the delivery of multicast content 26 and generally reduces or potentially eliminates the need for customer devices 16 to rejoin the multicast group.

The techniques also facilitate more efficient responses to customer originated IGMP join messages, as the multicast content from the requested multicast group may already be present on the ring network, removing the delay associated in conventional devices with forwarding this join message to router 12.

Figure 2:
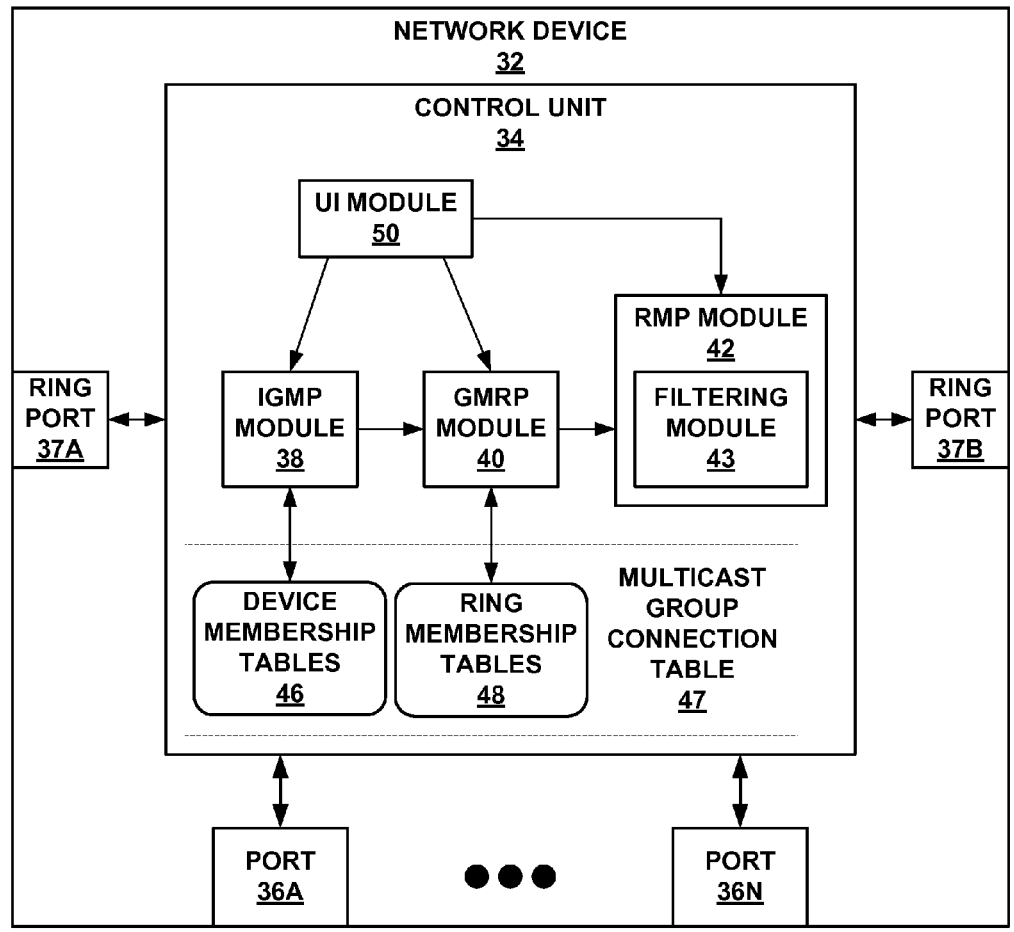
FIG. 2 is a block diagram illustrating an example network device that implements the techniques described in this disclosure.

FIG. 2 is a block diagram illustrating an example network device 32 that implements the techniques described in this disclosure. Network device 32 may represent either control node 18 or one of transport nodes 20, such as transport node 20B in that network device 32 generally includes the same hardware and software regardless of whether it is denoted as a control or transport node. That is, generally the only difference between transport and control nodes is that control functionality has been activated within a given node in a control node and remains inactivated with respect to the transport nodes. Consequently, for ease of illustration, network device 32 is first considered from the perspective of control node 18 and then from the perspective of transport node 20B within a ring network, such as ring network 10. While described in this manner for purposes of illustration, control nodes 18 and transport nodes 20 may differ from one another in terms of particular types of hardware/software implementations having different versions or components entirely.

As shown in the example of FIG. 2, network device 32 includes a control unit 34, ports 36A-36N ("ports 36") and ring ports 37A, 37B ("ring ports 37"). Control unit 34 may represent hardware or a combination of hardware and software that implements the virtual snooping bridge techniques described in this disclosure. Control units 34 may represent any combination of one or more processors, one or more field programmable gate arrays (FPGAs), one or more application specific integrated circuits (ASICs), and one or more application specific standard products (ASSPs). Control unit 34 also includes memory, both static (e.g., hard drives or magnetic drives, optical drives, FLASH memory, EPROM, EEPROM, etc.) and dynamic (e.g., RAM, DRAM, SRAM, etc.), or any other computer readable storage medium capable of storing instructions that cause the one or more processors to perform the efficient network management techniques described in this disclosure. Thus, control unit 34 may each represent any combination of hardware, which in some instances executes instructions or software, to support the below described components, modules or elements. The techniques should not be strictly limited to any particular example implementation described in this disclosure. Each of ports 36 represent either physical or logical ports that couple to links coupling nodes 18, 20 of ring network 10 to adjacent network devices, such as router 12 and access nodes 15. Ring ports 37 represent either physical or logical ports that couple to adjacent ones of links 22 that form the ring network.

Control unit 34 includes a number of modules, including IGMP module 38, a group management ring protocol (GRMP) module 40 ("GRMP module 40") and a ring management protocol (RMP) module 42 ("RMP module 42"). IGMP module 38 represents a module that implements IGMP in accordance with the above incorporated reference. IGMP module 38 stores data defining device membership tables 46, which indicate those of the multicast groups that customer devices 16 coupled to one or more of ports 36 have joined. Device membership tables 46 generally store forwarding entries that associate those of ports 36 that couple to the ring with one or more of ports 36 that couple to customer devices that have joined a multicast group. For example, if a customer device coupled to port 36N has joined a multicast group that is received via port 36A, device membership tables 46 generally store an entry for the multicast group identifying port 36A as the receiving port and port 36N as an output port.

GMRP module 40 represents a module that implements the group management ring protocol in accordance with the techniques of this disclosure. GMRP module 40 stores data defining ring membership tables 48, where ring membership tables 48 store entries defining multicast groups that have been joined by nodes 18, 20 of ring network 10, in which it is assumed for purposes of illustration first that network device 32 represents control node 18 and then transport node 20B. Ring membership tables 48 store entries similar to device membership tables 46 except that these entries identify groups joined by ring network devices. RMP module 42 represents a module that implements a ring management protocol. RMP module 42 includes a filtering module 43 that logically blocks one of ports 36, which is referred to in the context of control node 18 as secondary port 30. When activated, filtering module 43 logically blocks data VLANs arriving over a secondary one of ports 36 representative of secondary port 30.

In some instances, device membership tables 46 and ring membership tables 48 represent or form a single table referred to as a multicast group connection table 47. IGMP module 38 may add a new multicast group to table 47 in response to an IGMP join message received via any one of ports 36. IGMP module 38 adds the new multicast group and configures this group in table 47 by adding a leave pointer to the one of ports 36 over which the IGMP join message was received. GMRP module 40 may also add a new multicast group entry to table 47 in response to receiving a GMRP ring join message via one of ring ports 37. GMRP module 40, similar to IGMP module 38, configures this new entry with a leave pointer to ring ports 37A and 37B. Generally, IGMP module 38 and GMRP module 40 may create the new group in multicast group connection table 47, where IGMP module 38 may add or remove leafs corresponding to host ports 36 and GMRP may add or remove leaves corresponding to ring ports 37.

Control unit 34 also includes a user interface (UI) module 50 that presents one or more user interface with which an administrator or other user may interface to input data by which to configure control unit 34, in general, and IGMP module 38, GMRP module 40 and RMP module 42, in particular. Initially, in the context of control node 18, UI module 50 receives configuration data via one or more user interfaces and configures modules 36-42 so as to designate network device 32 as a control node substantially similar to control node 18. Once designated as control node 18, RMP module 42 activates filtering module 42 to begin logically blocking one of ports 36 represented by secondary node 30 in the example of FIG. 1. RMP module 42 also generates and forwards a fault detection message periodically via one of ring ports 37 representative of primary port 28 to detect faults in ring network 10. RMP module 42 may also monitor adjacent links or ring network devices coupled to ring ports 37 to detect faults either in the adjacent link or the adjacent ring network device.

Meanwhile, host devices similar to customer devices 16 coupled to network device 32 (usually indirectly as an access node similar to access node 15 is commonly positioned intermediate to customer device 16 and control node 18) generate and forward IGMP messages to network device 32 in the illustrative role as control node 18. IGMP module 38 receives these IGMP messages and processes them in accordance with IGMP. As one example, IGMP module 38 may receive an IGMP join message requesting to join the multicast group that provides multicast content 26 from server 24. IGMP module 38 may parse the IGMP join message to retrieve the multicast group identifier identifying the multicast group. Using this multicast group identifier as a key, IGMP module 38 access device membership tables 46 to determine whether network device 32 is already receive and forwarding multicast content 26 associated with the identified multicast group. If IGMP module 38 determines that multicast content 26 is already being delivered for the requested multicast group, IGMP module 36 updates the entry corresponding to the identified multicast group to reflect another join by the one of customer devices 16 and drops the IGMP join message. IGMP module 36 may inform GMRP module 40 of this join so it too can update its ring membership tables 48. If IGMP module 38 determines that multicast content 26 is not currently being delivered, IGMP module 38 proceeds to forward the IGMP join message to its intended destination.

GMRP module 40 transparently intercepts any forwarded IGMP messages, as shown in the example of FIG. 2. Referring to the above example, GMRP module 40 transparently intercepts the IGMP join message sent by IGMP module 38. GMRP module 40 extracts the multicast group identifier and uses this as a key when performing a lookup in ring membership tables 48. Based on whether or not an entry exists in ring membership tables 48 that is associated with the parsed multicast group identifier, GMRP module 40 forwards the IGMP join message. In some aspects, the lookup in ring membership tables 48 is similar to the lookup performed by IGMP module 38 in device membership tables 46 only the context of the lookup has changed. GMRP module 40 performs the lookup to determine whether multicast content 26 for the requested multicast group is currently being delivered around entire ring network 10 rather than just by network device 32. In this context, the lookup by GMRP module 40 identifies whether or not the virtual snooping bridge/switch is delivering multicast content 26 for the requested multicast group to any one of its "virtual ports" as represented by network nodes 18, 20.

If GMRP module 40 retrieves an entry that corresponds to the multicast group, GMRP module 40 generally identifies that at least one of the other nodes 20 of ring network 10 have previously requested to join the identified group and therefore that multicast content 26 is currently present on the ring. GMRP module 40, in this instance, updates the retrieved entry in ring membership tables 48 to reflect the additional consumption of multicast content 26 for the identified multicast group by the consuming one of consumer devices 16. If GMRP module 40 cannot locate an entry within ring membership tables 48 that correspond to the multicast group identifier, GMRP module 40 forwards the IGMP join message to the adjacent network device, i.e., router 12 in this example, via a corresponding one of ports 36. GMRP module 40 also generates a join ring message in accordance with the group management ring protocol based on the received IGMP join message and forwards this join ring message around ring network 10. In response to receiving this join ring message, each of nodes 20 configure their learning or forwarding table to provision delivery of content corresponding to the joined multicast group around ring network 10. In this respect, the join ring message represents an update message that updates nodes 18, 20 of operations taken by ring network 10 acting as the virtual snooping bridge. This update message effectively coordinates the various "ports" or nodes of ring network 10 so that ring network 10 may effectively present itself to adjacent external network devices as a snooping bridge or switch.

Again, as noted above, GMRP module 40 may perform a number of different operations to facilitate the presentation of ring network 10 to router 12 as a L2 snooping bridge or switch device. Each of these other operations may be performed in a similar manner to that of the join operation noted above and a number of different group ring messages, such as the join ring message, may be sent around ring network 10 via the control VLAN, as described below in further detail.

Assuming for purposes of illustration that network device 32 represent transport node 20B, UI module 50 receives configuration data that configures modules 36-42 in a manner that supports transport rather than control operations. Consequently, RMP module 42 remains mostly passive in the sense that it receives and forwards control message but does not actively generate periodic messages for the purposes of detecting faults. As a result of this transport configuration, filtering module 43 is not activated, but for the most part IGMP module 38 perform in substantially the same way as that described above with respect to network device 32 representing the role of control node 18.

In this transport role, network device 32 may receive IGMP messages from customer devices 16 coupled indirectly to one or more of ports 36. IGMP module 38 transparently intercepts or "snoops" these messages and performs the above described lookup in device membership tables 46. If the requested multicast group has been previously joined by network device 32, IGMP module 38 updates device membership tables 46 to account for the additional join, as well as, inform GMRP module 40 of this join so that it too can update its ring membership tables 48. Alternatively, GMRP module 40 monitors device membership tables 46 and notes any changes which it then carries over to its ring membership tables 48. In some instances, device membership tables 46 are merely a subset of ring membership tables 48 and updating one of tables 46 effectively updates a corresponding one of tables 48. In this respect, tables 46, 48 may be updated in any number of ways to reflect IGMP operations and the techniques should not be limited to any particular way of updating tables.

If the requested multicast group has not been previously joined by network device 32, IGMP module 38 forwards the IGMP join message to GMRP module 40, which proceeds to determine in the manner noted above whether another one of nodes 18, 20 have joined the requested multicast group by at least accessing ring membership tables 48. If it is determined that ring network 10 has already joined the identified multicast group, GMRP module 40 updates ring membership tables 48 and drops the IGMP join message without forwarding either the original IGMP join message or join ring message around ring network 10. If it is determined that ring network 10 has not already joined the identified multicast group, GMRP module 40 generates a join ring message based on the IGMP join message content and interfaces with RMP module 42 to send this join ring message via the control VLAN around ring network 10.

As described above, each of the remaining nodes 18, 20 update their respective learning tables in response to receiving the join ring message to install or otherwise configure delivery of content from the joined multicast group around ring network 10. Control node 18 also, upon receipt of this join ring message, generates an IGMP join message based on the join ring message and outputs this IGMP join message to router 12 to effectively join ring network 10 to the requested multicast group as if ring network 10 was a single snooping switch or bridge. Control node 18 then receives the content from the requested multicast group and forwards this content around ring network 10 via one of the data VLANs. Considering that each of transport nodes 20 previously configured their learning tables to arrange delivery of this content around ring network 10, transport nodes 20 receive and forward this traffic around ring network 10 such that each of nodes 18, 20 receive the content.

Upon receiving the content of the requested multicast group, transport node 20B, which network device 32 is currently assumed to represent for illustrative purposes, forwards this content internally to IGMP module 38, which proceeds to perform a lookup in device membership tables 46 to determine whether or not to forward this traffic to customer devices 16 via one of ports 36 that face customer devices 16. If none of the customer facing ones of ports 36 is associated with joined multicast group, transport node 20B forwards the content to transport node 20A.

In this respect, a transport node may implement the techniques of this disclosure to facilitate the representation of ring network 10 to adjacent external network devices as a single snooping bridge or switch. Again, while described above with respect to one operation, a join operation, the techniques may facilitate the emulation or virtualization of ring network 10 as a single snooping bridge or switch with respect to a number of other operations pertinent to IGMP or any other network protocol. These other operations are identified in greater detail below.

FIGS. 3A-3D are flowcharts illustrating example operation of a node positioned adjacent to a network device that provides access to multicast content, such as control node 18 of FIG. 1, in implementing various aspects of the techniques described in this disclosure. For purposes of illustration, network device 32 of FIG. 2 is assumed to represent control node 18 and for this reason reference to the components of network device 32 are often attributed to control node 18. As described above, whether a node is a control or a transport node is normally dictated by configuration and any given one of nodes 18, 20 may be configured as either the control node or a transport node. While described in the context of this assumption, the techniques should not be limited in this respect and a control node may, in some instances, differ substantially from transport nodes both in terms of components and operation.

Figure 3A:
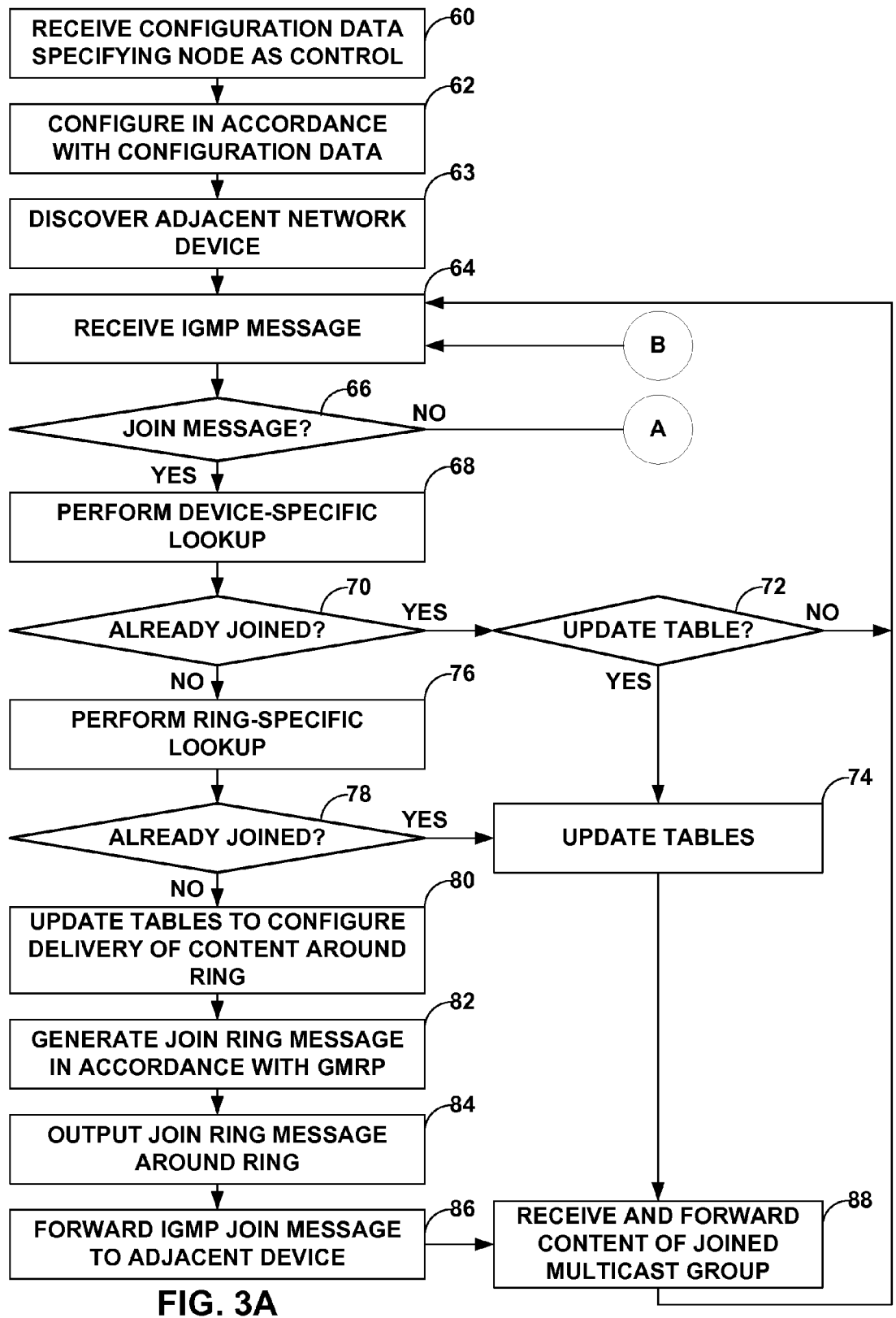
FIGS. 3A-3D are flowcharts illustrating example operation of a node positioned adjacent to a network device that provides access to multicast content in implementing various aspects of the techniques described in this disclosure.

Referring first to the example of FIG. 3A, network device 32 receives configuration data specifying the node as the control via a user interface presented by UI module 50, as described above (60). Control unit 34 of network device 32 then configures RMP module 42 in accordance with the received configuration data (62), whereupon network device 32 effectively assumes the role of control node 18 as shown in FIG. 1. Once configured, control node 18 then discovers that it is positioned adjacent to router 12, which again represents an adjacent network device that provides access to multicast content (63). Generally, control node 18 discovers router 12 upon receiving an IGMP general query message from router 12. More specifically, IGMP module 38 discovers router 12 upon receiving the IGMP join message. Upon discovering router 12, control node 18 may receive IGMP messages from customer devices 16 coupled to control node 18 and/or router 12 (64) via one or more of ports 36. Control unit 34 directs these IGMP messages to IGMP module 38, which in some instances determines first whether the received IGMP message is an IGMP join message (66).

If the received IGMP message is an IGMP join message ("YES" 66), IGMP module 38 performs a device-specific lookup using the parsed multicast group identifier as a key into device membership tables 46, as described above (68). This lookup identifies whether or not one or more of ports 36 are already joined or listening to the multicast group (70). If already joined, IGMP module 38 next determines if the identified one or more of ports 36 over which the IGMP join message was receives is already joined, or in other words, whether IGMP module 38 needs to update the table to add a new port or drop the IGMP join message (72). If the one of ports 36 over which the IGMP join message was received is included within the identified one or more of ports 36, then device membership tables 46 need to updated to add the one of ports 36 over which the IGMP join message was received as listening or joined to the multicast group ("YES" 72, 74). Otherwise, if the one of ports 36 over which the IGMP join message was received is included in the identified one or more ports 36, IGMP module 38 need not update tables 46 ("NO" 72).

If not already joined from the device-specific perspective, IGMP module 38 forwards the IGMP join message and GMRP module 40 intercepts this message and performs a ring-specific lookup in the manner described above with respect to ring membership tables 48 (76). If the ring-specific lookup indicates that ring network 10 has already joined the identified multicast group, GMRP module 40 update device membership tables 46 ("YES" 78, 74). If the ring-specific lookup indicates that ring network 10 has not already joined the identified multicast group, GMRP module 40 interfaces with IGMP module 38 to update device membership tables 46 and ring membership tables 48, generates a join ring message in accordance with the group management ring protocol (GMRP) and outputs through interactions with RMP module 42 the join ring message via the control VLAN ("YES" 78, 80-84). GMRP module 40 also forwards the received IGMP join message to the adjacent device, i.e., router 12 in this example (86). Once joined in any of these ways, control unit 34 receives and routes this content to IGMP module 38, whereupon IGMP module 38 forwards the multicast content of the joined multicast group in accordance with device membership tables 46, which have been previously configured as noted above to forward the multicast content to the requesting one of customer devices 16 (88).

IGMP module 38 also forwards the requested content via primary port 28, which is represented by one of ports 36. That is, IGMP module 38 may configure device membership tables 46 to install a forwarding entry in device membership tables 46 that instructs IGMP module 38 to forward a copy of the received multicast packet storing the content of the requested multicast group around ring network 10.

Figure 3B:
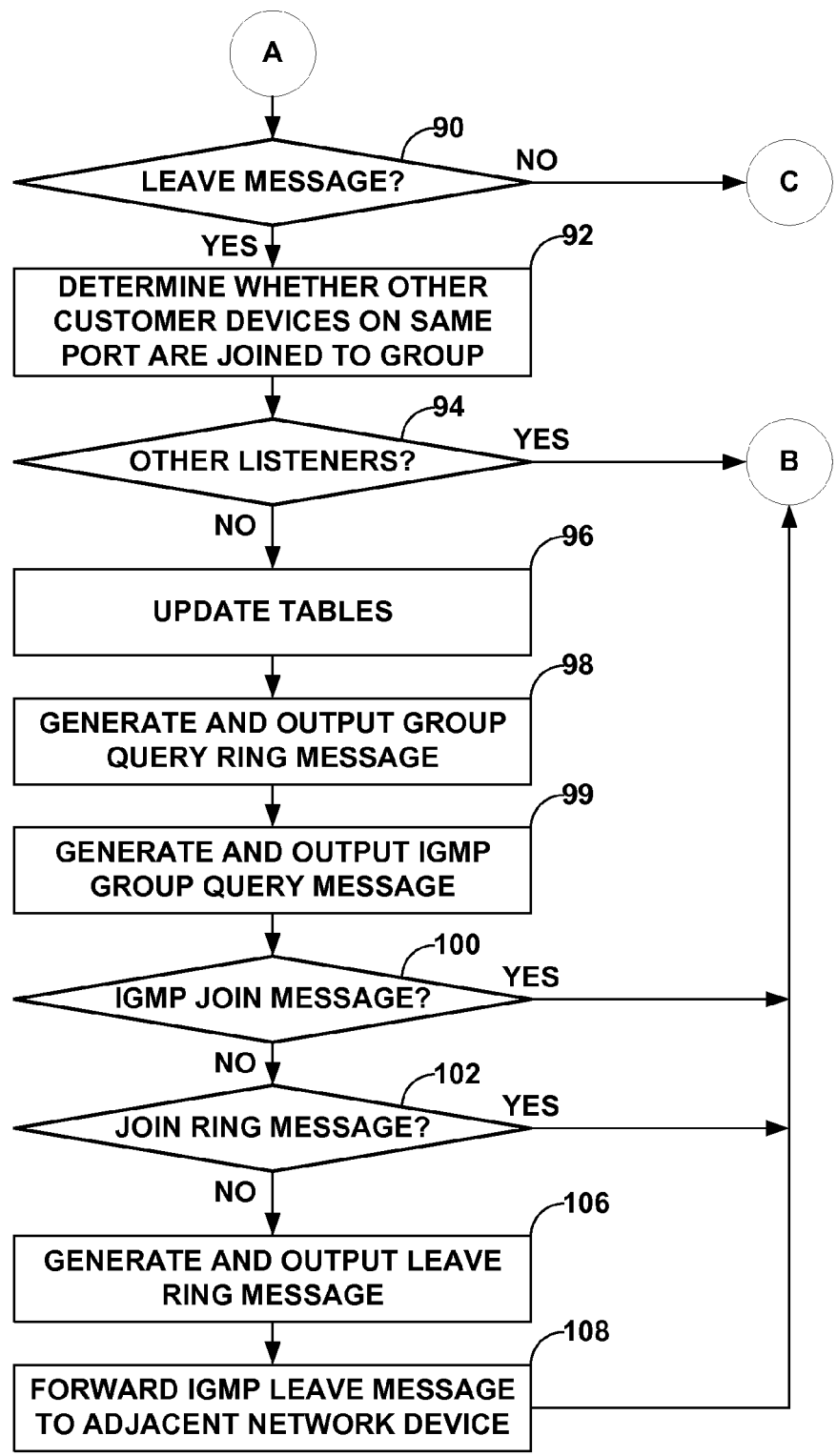

In any event, if the received IGMP message is not an IGMP join message ("NO" 66), IGMP module 38 determines whether the received IGMP message is an IGMP leave message, which is shown as step 90 in FIG. 3B. Referring to the example of FIG. 3B, if IGMP module 38 determines that the received IGMP message is an IGMP leave message ("YES" 90), IGMP module 38 then determines whether other customer devices 16 coupled to the same port over which the IGMP leave message was received are joined to the same multicast group identified in the IGMP leave message (92). IGMP module 38 may generate and issue an IGMP group query message in accordance with IGMP to determine if one or more other ones of customer devices 16 connected to the same port over which the IGMP leave message was received are listening or joined to the multicast group. Depending on the response of these customer devices, IGMP module 38 may determine whether or not other customer devices are listening or joined.

If there are other customer devices 16 coupled to control node 18 via the same port that are listening or joined to the multicast group identified in the IGMP leave message ("YES" 94), IGMP module 38 drops the IGMP leave message and does not update device membership tables 46 and waits for additional IGMP messages (64). If there are no other customer devices 16 coupled to control node 18 via the same port that are listening or joined to the multicast group identified in the IGMP leave message ("NO" 94), IGMP module 38 updates device membership tables 46 to remove the forwarding entry corresponding to the port so that the port is no longer listening or joined to the multicast group (96). IGMP module 38 forwards the IGMP leave message, which again GMRP module 40 transparently intercepts.

In response to intercepting this IGMP leave message, GMRP module 40 generates and outputs a group query ring message in accordance with the group management ring protocol (GMRP), which is similar in intent to the group query message defined by IGMP. To illustrate, the group ring query message requests that those of nodes 18, 20 having customer devices 16 joined to a multicast group identified in the group ring query message, respond to this query to indicate the current status of these devices 16 membership. The other nodes 18, 20, upon receiving this message, generate and issue IGMP group query messages to their respective customer devices 16, which either respond with an IGMP join message with a set amount of time or do not respond within the set amount of time.

If the other ones of nodes 18, 20 receive at least one IGMP join message in response to their respective IGMP group query message, the other ones of nodes 18, 20 generate a join ring message by translating the IGMP join message into the join ring message. Generally, each of the other ones of nodes 18, 20 respond to the group ring query message at randomly selected times and upon the first one of these other nodes 18, 20 sending a join ring message, all of the other nodes stop processing with respect to their IGMP group query message, as a single join ring message indicates that at least one of customer devices 16 coupled to ring network 10 is still listening and therefore that ring network 10 should continue to deliver this content. Control node 18 also issues an IGMP group query message to those of customer devices 16 coupled to control node 18 (99).

If control node receives an IGMP join message in response to this IGMP group query message ("YES" 100), IGMP module 38 drops the IGMP join message and any other message in response to the group query ring message and waits for another IGMP message (FIG. 3A, 64). If IGMP module 38 does not receive an IGMP join message in response to the IGMP group query message ("NO" 100), IGMP module 38 times out and forwards an IGMP leave message, which GMRP transparently intercepts. IGMP module 38 may include a timer or other indicator of duration and in response to this timer expiring, forwards the IGMP leave message. In any event, GMRP module 40 receives this IGMP leave message and determines whether or not to generate and output a GMRP leave ring message based on whether GMRP module 40 has received a GMRP join ring message in response to the GMRP group query ring message (102). If GMRP module 40 has not received a GMRP join ring message before timing out ("NO" 102, "NO" 104), as GMRP module 40 may also maintain a timer that denotes the maximum amount of time nodes 18, 20 have to respond to the GMRP group query ring message, GMRP module 40 continues to wait for a GMRP join ring message (102).

If no GMRP join ring messages are received and timer denoting the time by which GMRP module 40 can receive this message times out ("NO" 102), GMRP module 40 generates and outputs a leave ring message (106) indicating that ring network 10 should leave the multicast group identified in the originally received IGMP leave message. GMRP module 40 also forwards the IGMP leave message to the adjacent network device, i.e., router 12 in the example of FIG. 1. After forwarding this IGMP leave message, control node 18 returns to waiting to receive IGMP messages (FIG. 3A, 64).

Figure 3C:
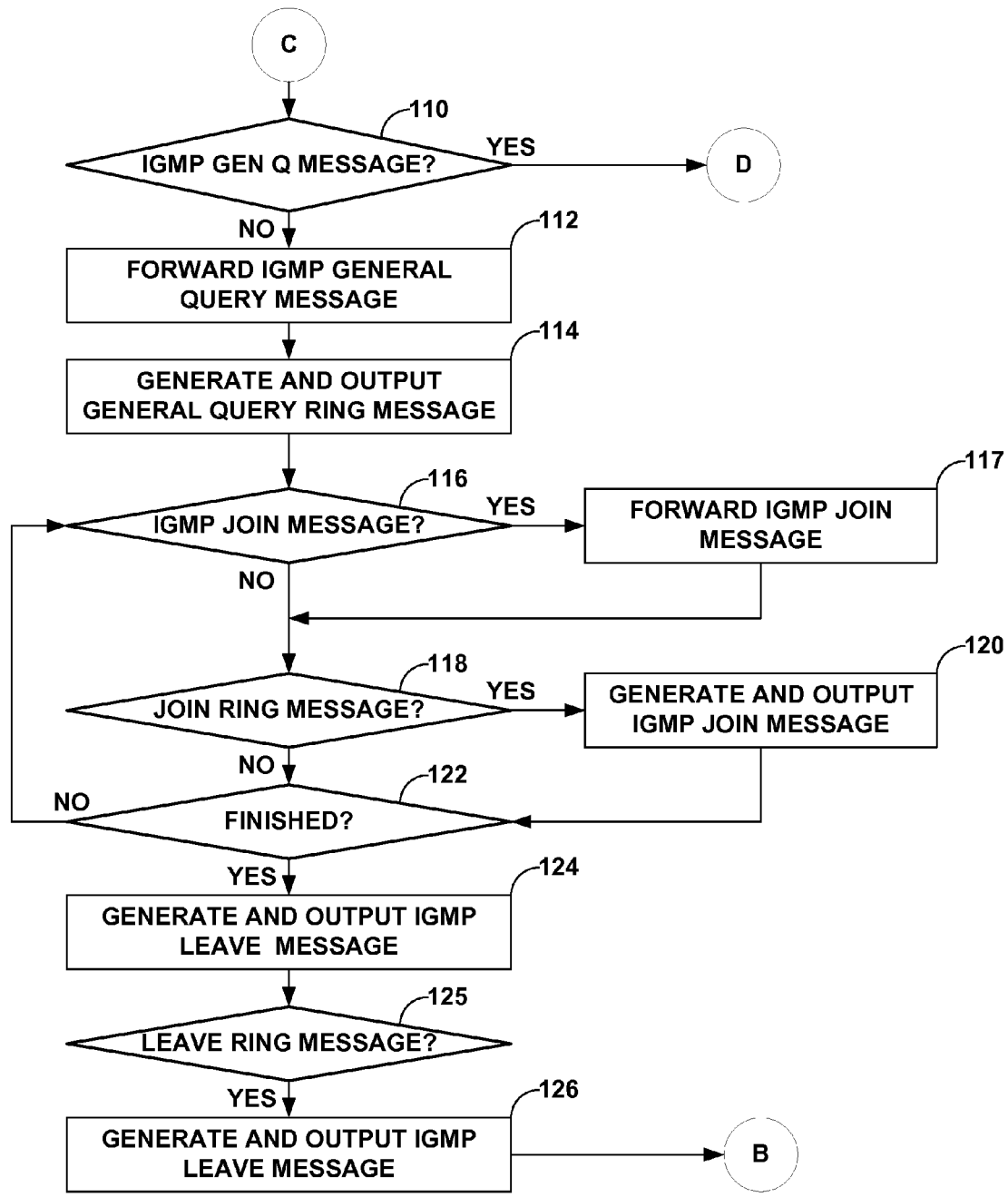
Figure 3D:
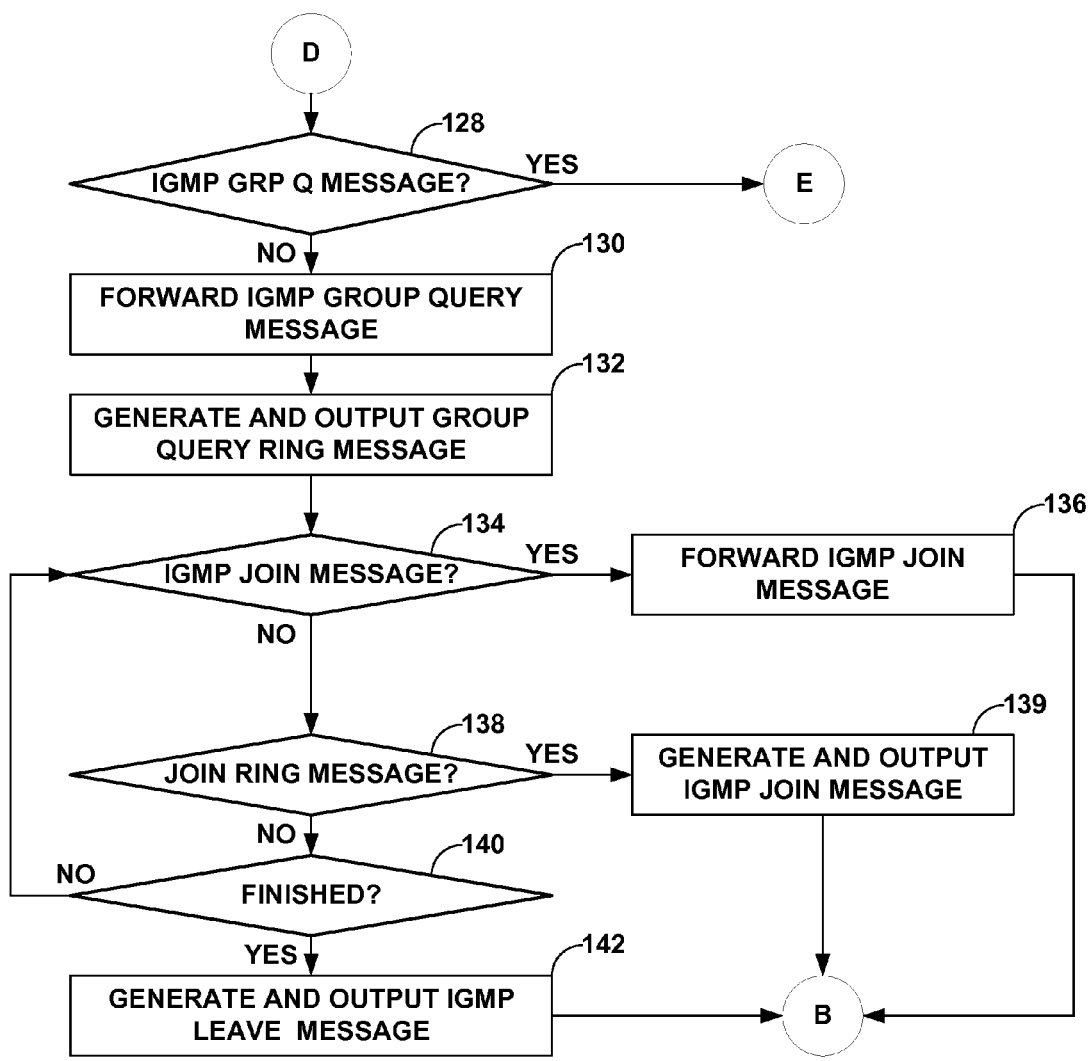

If the received IGMP message is not an IGMP general query message ("NO" 110), IGMP module 38 determines whether the received IGMP message is an IGMP group query message ("IGMP GRP Q message"), which is shown as step 128 in FIG. 3D. Referring to the example of FIG. 3D, if IGMP module 38 determines that the received IGMP message is an IGMP group query message ("YES" 128), IGMP forwards the IGMP group query message to customer device 16 coupled to control node 18, while GMRP module 40 generates and outputs a group query ring message in accordance with GMRP (130, 132).

IGMP module 38 typically waits a set amount of time for the multicast group identified in the IGMP group query message, as commonly defined by a timer for each of the respective multicast groups, to receive an IGMP join message (134). In response to receiving an IGMP join message ("YES" 134), IGMP module 38 forwards the IGMP join message to router 12 provided that no other IGMP join messages have been forwarded that identify the multicast group identified by the IGMP join message received from one of customer devices 16 coupled to control node 18 (136). GMRP module 40 also waits to receive GMRP join ring messages in response to sending the GMRP general query message (138). If a GMRP join ring message is received, GMRP module 40 first verifies that no other IGMP join messages have been sent in the manner noted above, and assuming one has not been previous sent, generates and outputs an IGMP join message based on the received GMRP join ring message (139). In the event either IGMP module 38 or GMRP module 40 sends an IGMP join message, control node 18 has finished processing the received IGMP group query message and once again waits to receive IGMP messages (FIG. 3A, 64).

IGMP module 38 and GMRP module 40 continue in this manner until they are finished, where these modules 38, 40 are finished when the timer that denote a period of time during which these modules 38, 40 will accept IGMP join messages and GMRP join ring message for the multicast groups identified in the IGMP group query message received from router 12 (140). If not finished ("NO" 140), these modules 38, 40 continue to wait for IGMP join and GMRP join ring messages until the timer has expired. Once the timer has expired, meaning that the time for receiving messages in response to the IGMP general query message and GMRP general query ring message has finished ("YES" 140), IGMP module 38 generates and outputs an IGMP leave message, which GMRP module 40 drops if it received a GMRP join ring message. If not, GMRP module 40 forwards the IGMP leave message to router 12 (142).

GMRP module 40 may also receive GMRP leave ring messages from other nodes 18 when the timers are active and hold these messages until after all timers are finished (125). GMRP module 40 may then correlate these GMRP leave ring messages with the other GMRP join message to verify that this leave ring message should be sent to router 12 as an IGMP leave message in the manner described above. Assuming at least one IGMP leave message should be sent, GMRP module 40 generates the IGMP leave message based on the GMRP leave ring message and outputs this message to router 12 (126). Control node 18 then returns to waiting for another IGMP message (FIG. 3A, 64).

In any event, if the received IGMP message is not an IGMP leave message ("NO" 90), IGMP module 38 determines whether the received IGMP message is an IGMP general query message ("IGMP GEN Q message"), which is shown as step 110 in FIG. 3C. Referring to the example of FIG. 3C, if IGMP module 38 determines that the received IGMP message is an IGMP generally query message ("YES" 110), IGMP forwards the IGMP general query message to customer device 16 coupled to control node 18, while GMRP module 40 generates and outputs a general query ring message in accordance with GMRP (112, 114). An IGMP general query message is similar to an IGMP group query message only that it generally requests the status of all multicast groups to which one or more customer devices 16 are joined or listening. Likewise, the GMRP general query ring message is similar to the GMRP group query ring message in that the GMRP general query ring message requests general membership information from all of nodes 18, 20 regarding their respective customer devices 16's multicast group memberships. Customer devices 16 coupled to control node 18 respond with IGMP join messages while nodes 20 respond with GMRP join ring messages, but both serve the same purpose of informing control node 18 that at least one of customer devices 16 coupled either to control node 18 or one of nodes 20 is joined or listening to the multicast group identified in these messages.

IGMP module 38 typically waits a set amount of time for each of the multicast groups identified in device membership table 46, as commonly defined by a timer for each of the respective multicast groups, to receive an IGMP join message (116). In response to receiving an IGMP join message ("YES" 116), IGMP module 38 forwards the IGMP join message to router 12 so long as no other IGMP join messages have been forwarded that identify the multicast group identified by the IGMP join message received from one of customer devices 16 coupled to control node 18 (117). That is, IGMP module 38 monitors which of the multicast groups identified in device membership table 46 have been indicated by IGMP join messages to router 12 and only sends an IGMP join message for any given multicast group defined by table 46 if no other IGMP join messages have been previously sent to router 12 that identify the same multicast group. GMRP module 40 also waits to receive GMRP join ring messages in response to sending the GMRP general query message (118). If a GMRP join ring message is received, GMRP module 40 first verifies that no other IGMP join messages have been sent in the manner noted above, and assuming one has not been previous sent, generates and outputs an IGMP join message based on the received GMRP join ring message (120).

IGMP module 38 and GMRP module 40 continue to operate in this manner until they are finished, where these modules 38, 40 are finished when all of the various timers that denote a period of time during which these modules 38, 40 will accept IGMP join messages and GMRP join ring message for each of the multicast groups identified in tables 46, 48 (122). If not finished ("NO" 122), these modules 38, 40 continue to wait for IGMP join and GMRP join ring messages until all of the timers have expired. Once these timers have expired, meaning that the time for receiving messages in response to IGMP general query messages and GMRP general query ring messages has finished ("YES" 122), IGMP module 38 determines those of the multicast groups identified by device membership table 46 for which IGMP module 38 did not receive an IGMP join message and generates and outputs, to router 12, an IGMP leave message identifying these determined multicast groups are no longer being listened to by any of customer devices 16 (124). GMRP module 40 may intercept these IGMP leave messages and drop any of those identifying a multicast group for which GMRP module 40 received a GMRP join ring message identifying the same multicast group.

GMRP module 40 may also receive GMRP leave ring messages from other nodes 18 when the timers are active and hold these messages until after all timers are finished (125).

GMRP module 40 may then correlate these GMRP leave ring messages with the other GMRP join message to verify that this leave ring message should be sent to router 12 as an IGMP leave message in the manner described above. Assuming at least one IGMP leave message should be sent, GMRP module 40 generates the IGMP leave message based on the GMRP leave ring message and outputs this message to router 12 (126). Control node 18 then returns to waiting for another IGMP message (FIG. 3A, 64). In this manner, control node 18 implements the techniques described in this disclosure to address IGMP messages sent by router 12 and customer devices 16 such that ring network 10 appears as a single L2 network device, e.g., a snooping bridge or switch, to both router 12 and customer devices 16.

Figure 4:
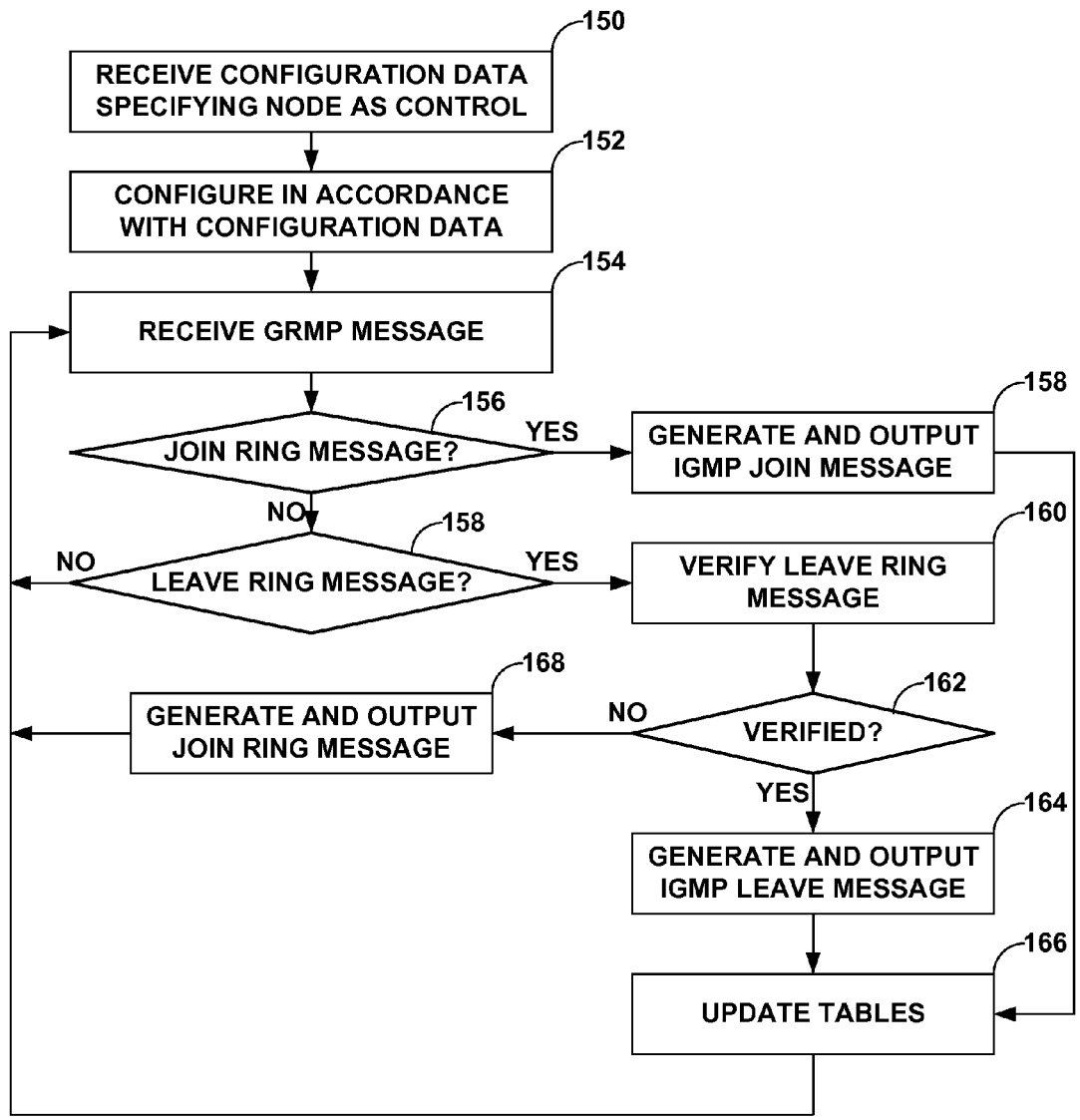
FIG. 4 is a flowchart illustrating example operation of a node positioned adjacent to a network device that provides access to multicast content in implementing other aspects of the techniques described in this disclosure.

FIG. 4 is a flowchart illustrating example operation of a node positioned adjacent to a network device that provides access to multicast content, such as control node 18 of FIG. 1, in implementing other aspects of the techniques described in this disclosure. As noted above, for purposes of illustration, network device 32 of FIG. 2 is assumed to represent control node 18 and for this reason reference to the components of network device 32 are attributed to control node 18. As described above, whether a node is a control or a transport node is normally dictated by configuration and any given one of nodes 18, 20 may be configured as either the control node or a transport node. While described in the context of this assumption, the techniques should not be limited in this respect and a control node may, in some instances, differ substantially from transport nodes both in terms of components and operation.

Referring to the example of FIG. 4, network device 32 may receive configuration data specifying that this device should assume the role of the control node and configures modules 40, 42 in accordance with the configuration data, as described above (150, 152). While servicing IGMP messages in the manner described above with respect to FIGS. 3A-3D, GMRP module 40 of control unit 18 also receives a GMRP message from one or more of transport nodes 20 (154). GMRP module 40 may determine if the received GMRP message is a GMRP join ring message (156). If so ("YES" 156), GMRP module 40 generates and outputs an IGMP join message to router 12 in accordance with GMRP (158). Alternatively, GMRP module 40 may determine that the received GMRP message is not a GMRP join ring message ("NO" 156), but a GMRP leave ring message ("YES" 158), whereupon GMRP module 40 verifies the GMRP leave ring message in the manner described above (160). If verified ("YES" 162), GMRP module generates and outputs an IGMP leave message to router 12 (164). After outputting the IGMP leave message or after generating and outputting an IGMP join message, GMRP module 40 updates ring membership tables 48 in the manner described above (166). If not verified ("NO" 168), GMRP message generates and outputs a GMRP join ring message (168). Regardless of the actions taken to address the various GMRP messages, control node 18 continues in this manner to receive and process GMRP message (154-168).

Figure 5A:
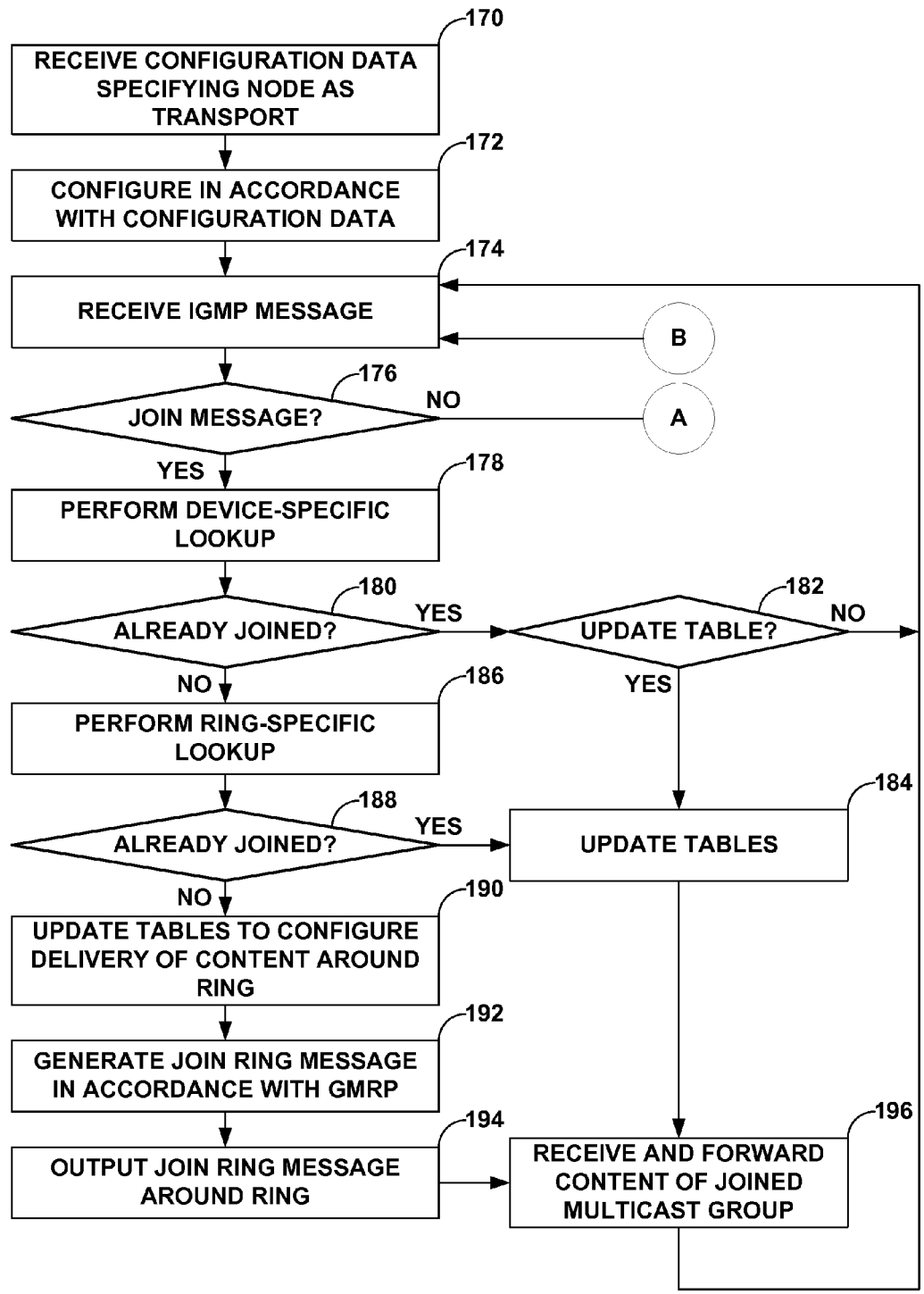
FIGS. 5A-5B are flowcharts illustrating example operation of a node indirectly coupled to an adjacent node in implementing various aspects of the techniques described in this disclosure.
Figure 5B:
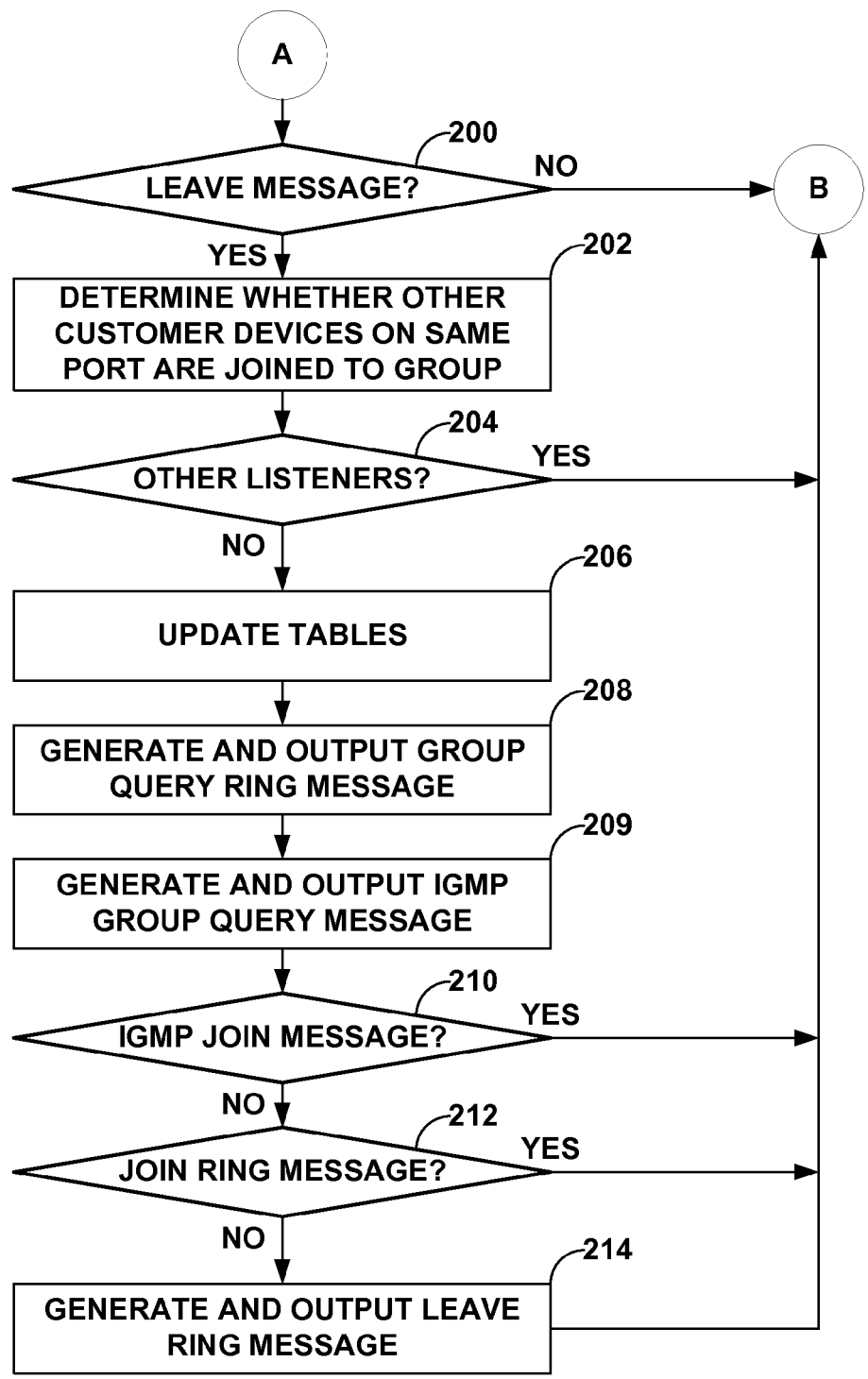

FIGS. 5A-5B are flowcharts illustrating example operation of a node indirectly coupled to an adjacent node, such as transport node 20B of FIG. 1, in implementing various aspects of the techniques described in this disclosure. For purposes of illustration, network device 32 of FIG. 2 is assumed to represent transport node 20B and for this reason reference to the components of network device 32 are often attributed to transport node 20B. As described above, whether a node is a control or a transport node is normally dictated by configuration and any given one of nodes 18, 20 may be configured as either the control node or a transport node. While described in the context of this assumption, the techniques should not be limited in this respect and a control node may, in some instances, differ substantially from transport nodes both in terms of components and operation.

Referring first to the example of FIG. 5A, network device 32 receives configuration data specifying the node as a transport via a user interface presented by UI module 50, as described above (170). Control unit 34 of network device 32 then configures RMP module 42 in accordance with the received configuration data (172), whereupon network device 32 effectively assumes the role of transport node 20B as shown in the example of FIG. 1. Once configured, transport node 20B receives IGMP messages from customer devices 16 coupled to transport node 20B (174) via one or more of ports 36. Control unit 34 directs these IGMP messages to IGMP module 38, which in some instances determines first whether the received IGMP message is an IGMP join message (176).

If the received IGMP message is an IGMP join message ("YES" 176), IGMP module 38 performs a device-specific lookup using the parsed multicast group identifier as a key into device membership tables 46, as described above (68). This lookup identifies whether or not one or more of ports 36 are already joined or listening to the multicast group (180). If already joined, IGMP module 38 next determines if the identified one or more of ports 36 over which the IGMP join message was receives is already joined, or in other words, whether IGMP module 38 needs to update the table to add a new port or drop the IGMP join message (182). If the one of ports 36 over which the IGMP join message was received is included within the identified one or more of ports 36, then device membership tables 46 need to updated to add the one of ports 36 over which the IGMP join message was received as listening or joined to the multicast group ("YES" 182, 184). Otherwise, if the one of ports 36 over which the IGMP join message was received is included in the identified one or more ports 36, IGMP module 38 need not update tables 46 ("NO" 182).

If not already joined from the device-specific perspective, IGMP module 38 forwards the IGMP join message and GMRP module 40 intercepts this message and performs a ring-specific lookup in the manner described above with respect to ring membership tables 48 (186). If the ring-specific lookup indicates that ring network 10 has already joined the identified multicast group, GMRP module 40 updates device membership tables 46 ("YES" 188, 184). If the ring-specific lookup indicates that ring network 10 has not already joined the identified multicast group, GMRP module 40 interfaces with IGMP module 38 to update device membership tables 46 and ring membership tables 48, generates a join ring message in accordance with the group management ring protocol (GMRP) and outputs through interactions with RMP module 42 the join ring message via the control VLAN ("YES" 188, 190-194). Once joined in any of these ways, control unit 34 receives and routes multicast content to IGMP module 38, whereupon IGMP module 38 forwards the multicast content of the joined multicast group in accordance with device membership tables 46, which have been previously configured as noted above to forward the multicast content to the requesting one of customer devices 16 (198).

IGMP module 38 also forwards the requested content via primary port 28, which is represented by one of ports 36. That is, IGMP module 38 may configure device membership tables 46 to install a forwarding entry in device membership tables 46 that instructs IGMP module 38 to forward a copy of the received multicast packet storing the content of the requested multicast group around ring network 10.

In any event, if the received IGMP message is not an IGMP join message ("NO" 176), IGMP module 38 determines whether the received IGMP message is an IGMP leave message, which is shown as step 90 in FIG. 5B. Referring to the example of FIG. 5B, if IGMP module 38 determines that the received IGMP message is an IGMP leave message ("YES" 200), IGMP module 38 then determines whether other customer devices 16 coupled to the same port over which the IGMP leave message was received are joined to the same multicast group identified in the IGMP leave message (202). IGMP module 38 may generate and issue an IGMP group query message in accordance with IGMP to determine if one or more other ones of customer devices 16 connected to the same port over which the IGMP leave message was received are listening or joined to the multicast group. Depending on the response of these customer devices, IGMP module 38 may determine whether or not other customer devices are listening or joined.

If there are other customer devices 16 coupled to control node 18 via the same port that are listening or joined to the multicast group identified in the IGMP leave message ("YES" 204), IGMP module 38 drops the IGMP leave message and does not update device membership tables 46 and waits for additional IGMP messages (FIG. 5A, 194). If there are no other customer devices 16 coupled to control node 18 via the same port that are listening or joined to the multicast group identified in the IGMP leave message ("NO" 94), IGMP module 38 updates device membership tables 46 to remove the forwarding entry corresponding to the port so that the port is no longer listening or joined to the multicast group (96). IGMP module 38 forwards the IGMP leave message, which again GMRP module 40 transparently intercepts.

In response to intercepting this IGMP leave message, GMRP module 40 generates and outputs a group query ring message in accordance with the group management ring protocol (GMRP), which is similar in intent to the group query message defined by IGMP, as described above. If the other ones of nodes 18, 20 receive at least one IGMP join message in response to their respective IGMP group query message, the other ones of nodes 18, 20 generate a join ring message by translating the IGMP join message into the join ring message. Generally, each of the other ones of nodes 18, 20 respond to the group ring query message at randomly selected times and upon the first one of these other nodes 18, 20 sending a join ring message, all of the other nodes stop processing with respect to their IGMP group query message, as a single join ring message indicates that at least one of customer devices 16 coupled to ring network 10 is still listening and therefore that ring network 10 should continue to deliver this content. Transport node 20B also issues an IGMP group query message to those of customer devices 16 coupled to control node 18 (209).

Upon receiving an IGMP join message in response to this IGMP group query message ("YES" 210), IGMP module 38 drops the IGMP join message and any other message in response to the group query ring message and waits for another IGMP message (FIG. 5A, 174). If IGMP module 38 does not receive an IGMP join message in response to the IGMP group query message ("NO" 210), IGMP module 38 times out and forwards an IGMP leave message, which GMRP transparently intercepts. IGMP module 38 may include a timer or other indicator of duration and in response to this timer expiring, forwards the IGMP leave message. In any event, GMRP module 40 receives this IGMP leave message and determines whether or not to generate and output a GMRP leave ring message based on whether GMRP module 40 has received a GMRP join ring message in response to the GMRP group query ring message (102). If GMRP module 40 has not received a GMRP join ring message before timing out ("NO" 212, "NO" 214), as GMRP module 40 may also maintain a timer that denotes the maximum amount of time nodes 18, 20 have to respond to the GMRP group query ring message, GMRP module 40 continues to wait for a GMRP join ring message (212).

If no GMRP join ring messages are received and timer denoting the time by which GMRP module 40 can receive this message times out ("NO" 212), GMRP module 40 generates and outputs a leave ring message (214) indicating that ring network 10 should leave the multicast group identified in the originally received IGMP leave message. After forwarding this IGMP leave ring message, transport node 20B returns to waiting to receive IGMP messages (FIG. 5A, 174).

Figure 6A:
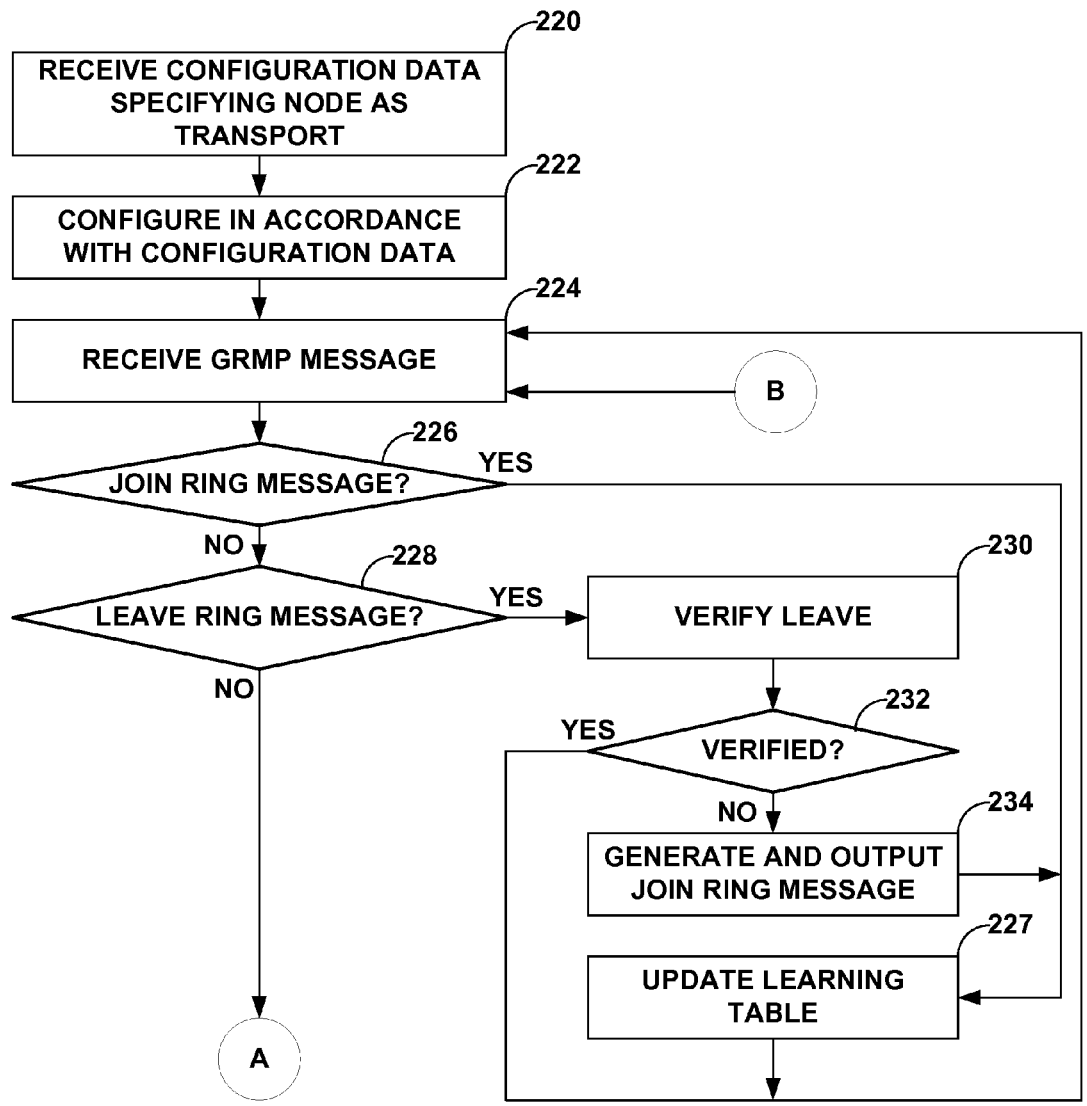
FIGS. 6A-6B are flowcharts illustrating example operation of a node indirectly coupled to an adjacent node in implementing other aspects of the techniques described in this disclosure.
Figure 6B:
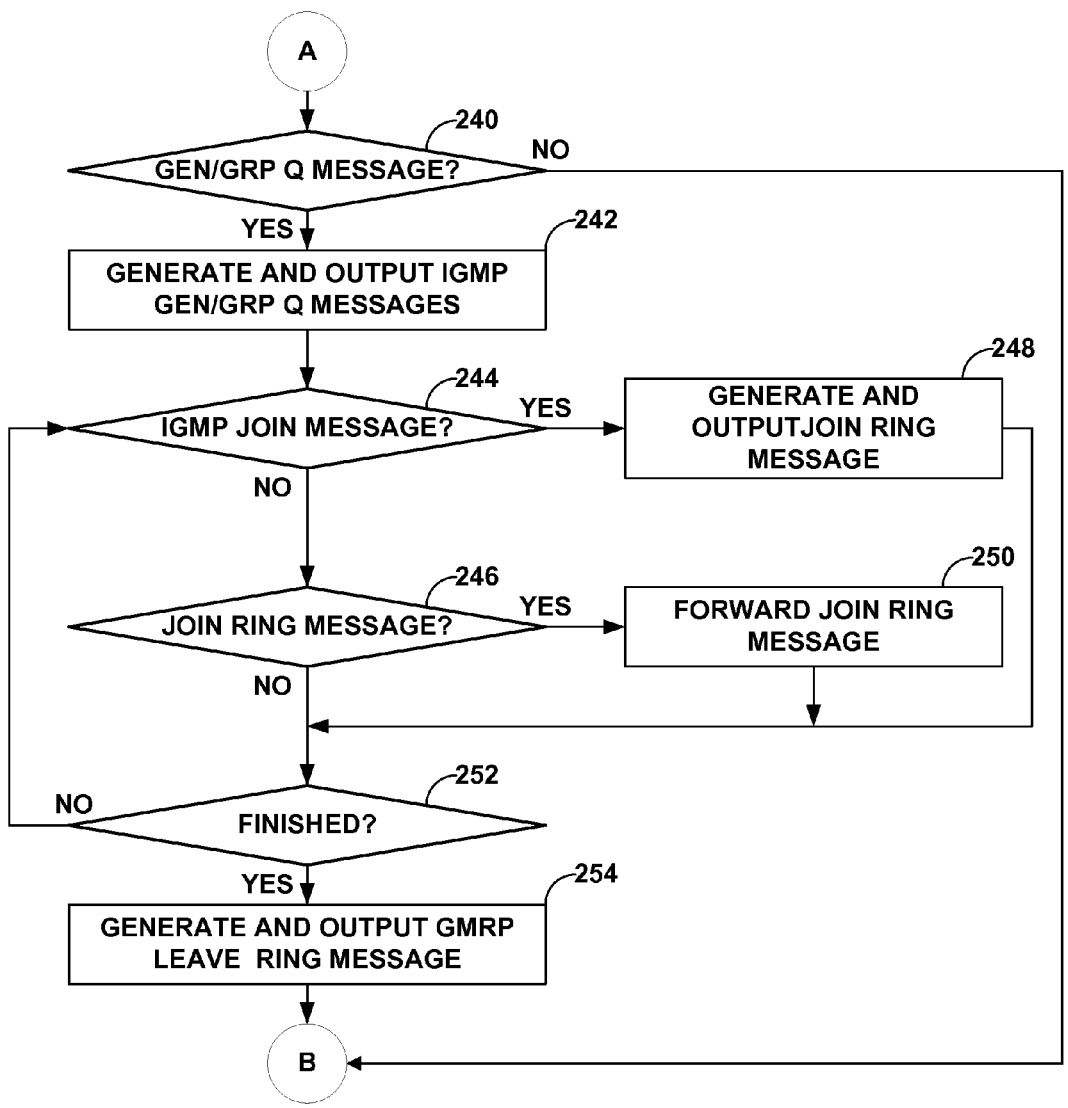

FIGS. 6A-6B are flowcharts illustrating example operation of a node of a node indirectly coupled to an adjacent node, such as transport node 20B of FIG. 1, in implementing other aspects of the techniques described in this disclosure. As noted above, for purposes of illustration, network device 32 of FIG. 2 is assumed to represent transport node 20B and for this reason reference to the components of network device 32 are attributed to control node 20B. As described above, whether a node is a control or a transport node is normally dictated by configuration and any given one of nodes 18, 20 may be configured as either the control node or a transport node. While described in the context of this assumption, the techniques should not be limited in this respect and a control node may, in some instances, differ substantially from transport nodes both in terms of components and operation.

Referring to the example of FIG. 6A, network device 32 may receive configuration data specifying that this device should assume the role of the control node and configures modules 40, 42 in accordance with the configuration data, as described above (220, 222). While servicing IGMP messages in the manner described above with respect to FIGS. 3A-3D, GMRP module 40 of control unit 18 also receives a GMRP message from one or more of nodes 18, 20 (224). GMRP module 40 may determine if the received GMRP message is a GMRP join ring message (226). If so ("YES" 226), GMRP module 40 updates ring membership table 48 in the manner described above to configure delivery of the content of the joined multicast group around ring network 10 (227. Alternatively, GMRP module 40 may determine that the received GMRP message is not a GMRP join ring message ("NO" 226), but a GMRP leave ring message ("YES" 228), whereupon GMRP module 40 verifies the GMRP leave ring message in the manner described above (230). If verified ("YES" 233), GMRP module 40 updates ring membership tables 48 in the manner described above to remove the entry corresponding to the multicast group from ring membership tables 48 (227). If not verified ("NO" 232), GMRP message generates and outputs a GMRP join ring message (234).

If the GMRP message is not a leave ring message ("NO" 228), GMRP module 40 determines whether the GMRP message is either of a GMRP general or group query ring message ("GEN/GRP Q message"), which is shown as step 240 in the example of FIG. 6B. Referring to FIG. 6B, if the GMRP message is either a GMRP general or group query ring message ("YES" 240), GMRP module 40 generates and outputs a corresponding IGMP general or group query message, which as described about are similar except for the scope of the query (242). IGMP module 38 waits to receive one or more IGMP join message, where only one may be received in response to a group query message and one or more may be received in response to the general query message (244).

Likewise, GMRP module 40 waits to receive one or more join ring messages in the manner describe above (246).

In response to receiving an IGMP join message ("YES" 244), IGMP module generates and outputs a join ring message indicating that one of customer device 16 is still joined or listening to one of the multicast groups, which may be the one specified in the group query message or one of the many multicast groups potentially specified in a general query message (248). GMRP module 40 may intercept this GMRP join ring message and verify that no other GMRP join ring messages identifying the same multicast group has already been forwarded for the reasons described above. Similar to IGMP module 38, GMRP module 40 may, in response to receiving a join ring message ("YES" 246), forward any received join ring messages (250). GMRP module 40 may account for this join ring message in ring membership tables 48. At this point, IGMP and GMRP modules 38, 40 determine if they are finished, as described above (252). If not finished ("NO" 252), these modules 38, 40 continue to wait to receive IGMP join and GMRP join ring messages. Once finished ("YES" 252), GMRP modules 40 to send leave ring messages, both as originally generated and as translated from IGMP leave messages generated by IGMP module 38 (254). If the GMRP message is neither a general nor group query message or after generating and outputting GMRP leave ring messages, transport node 20B returns to waiting for additional GMRP messages to process in the manner described above (FIG. 6A, 224).

Figure 7A:
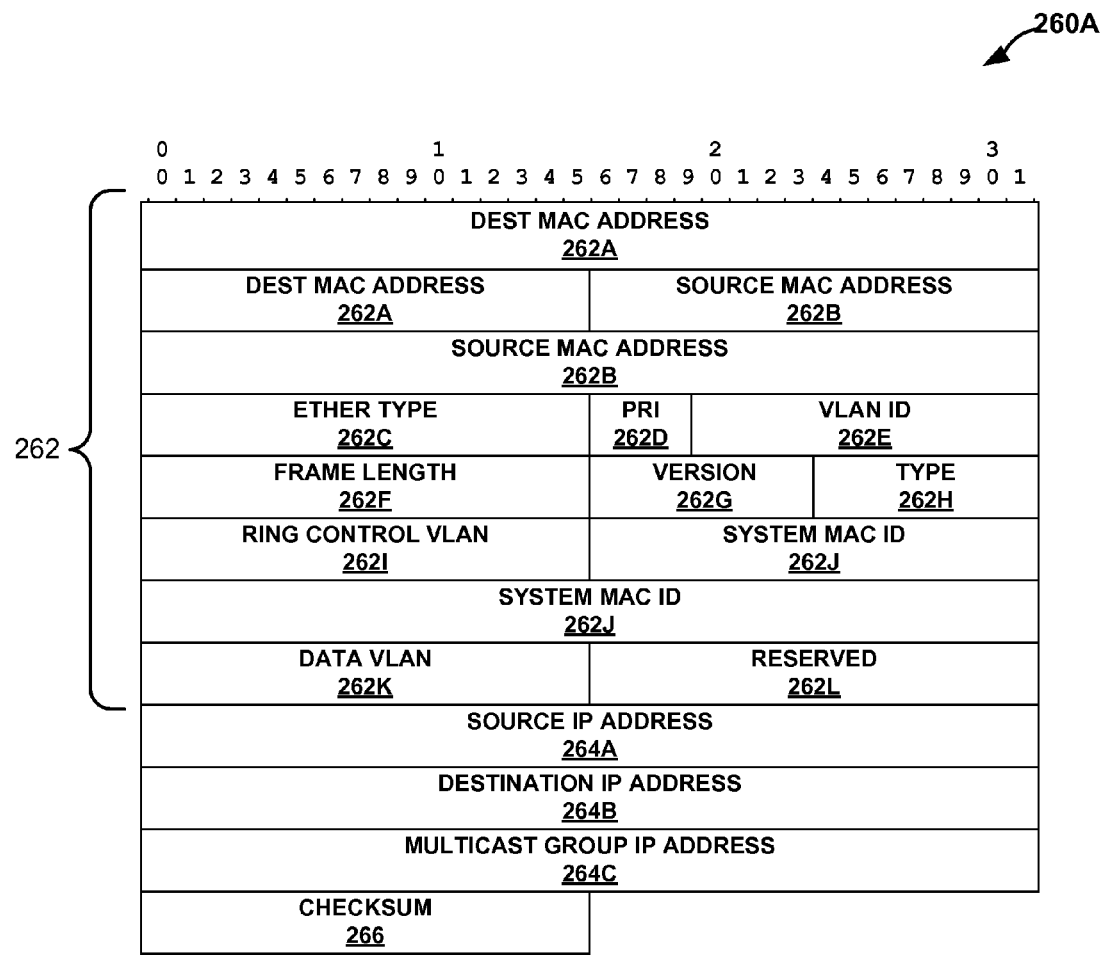
FIGS. 7A-7E are block diagrams illustrating various example messages formed in accordance with the group management ring protocol described in this disclosure.
Figure 7B:
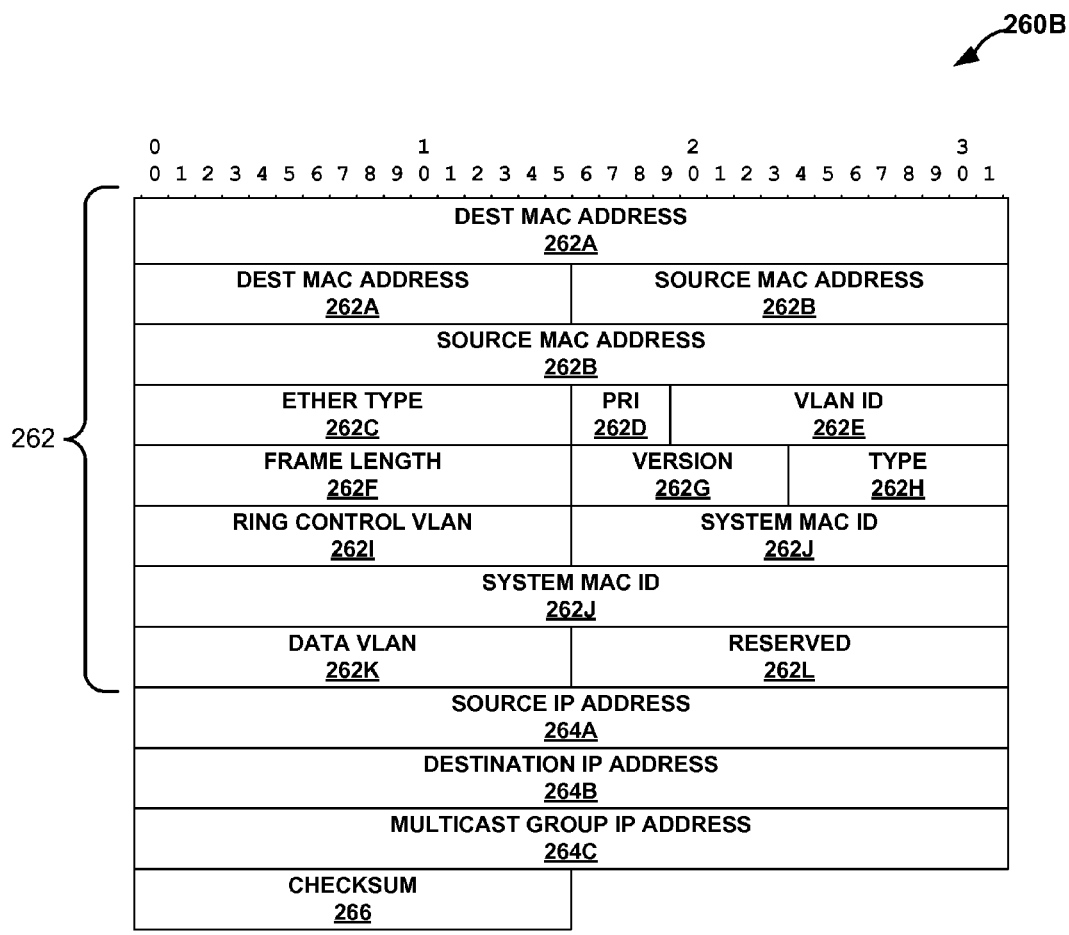
Figure 7C:
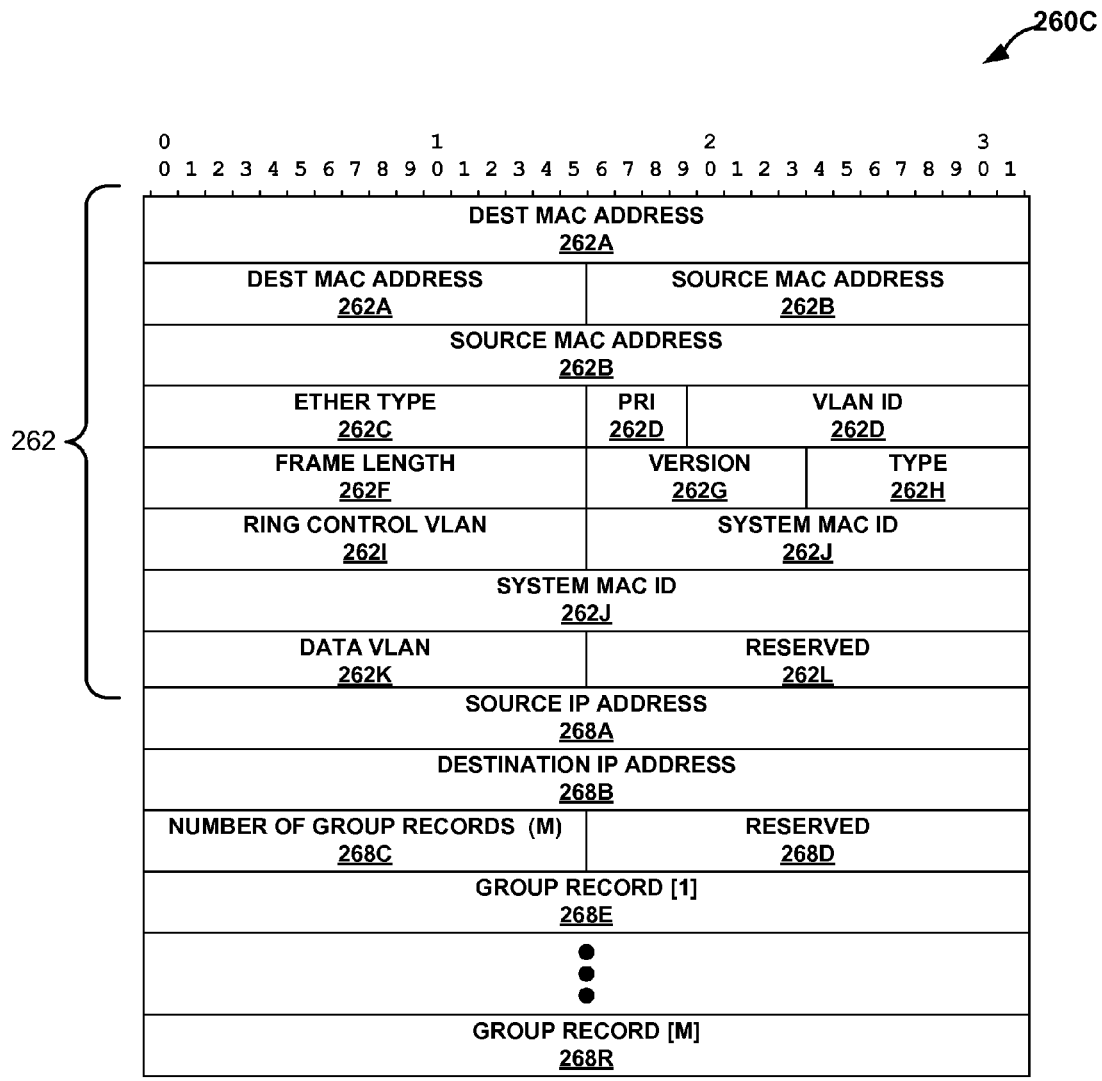
Figure 7D:
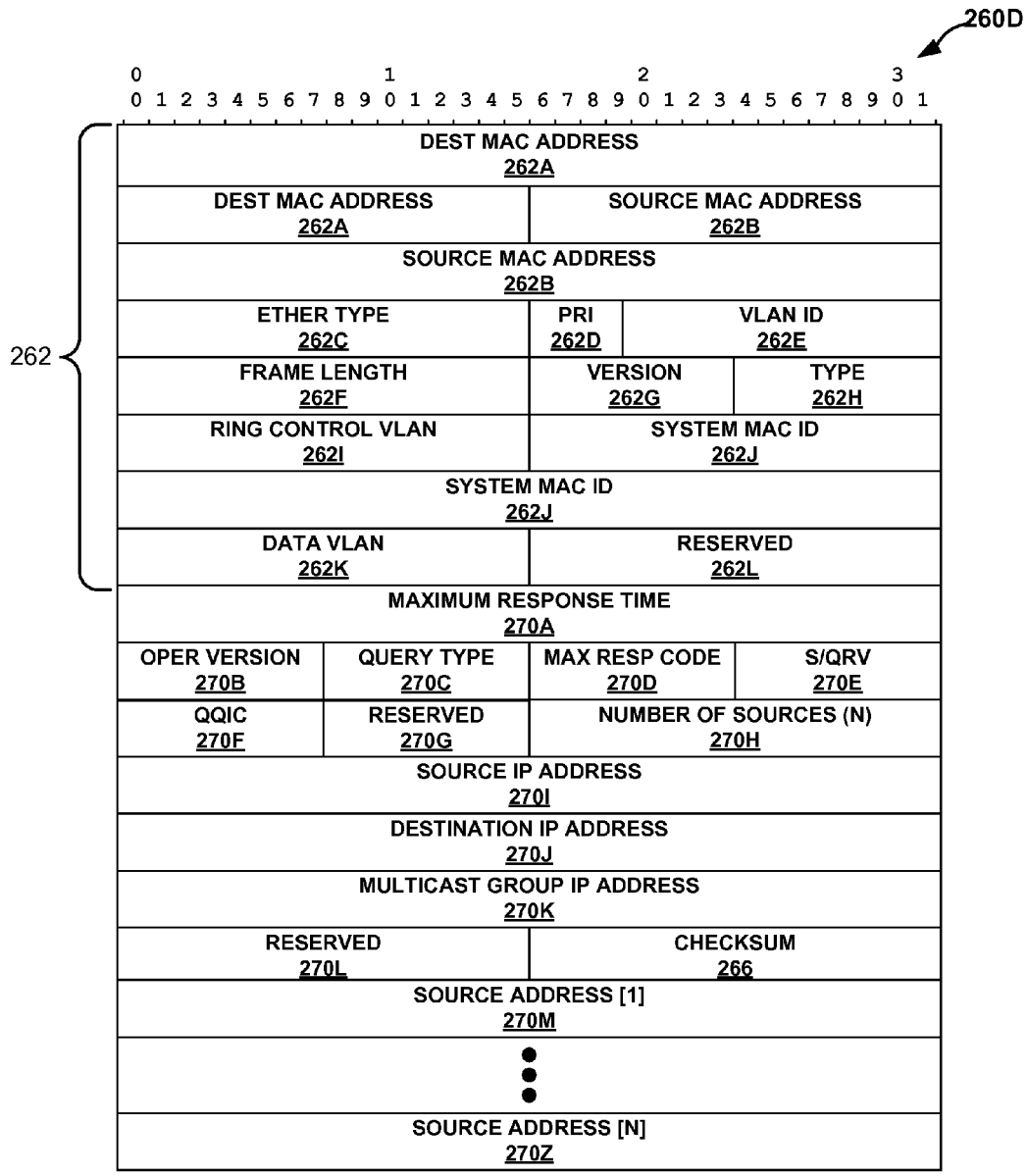
Figure 7E:
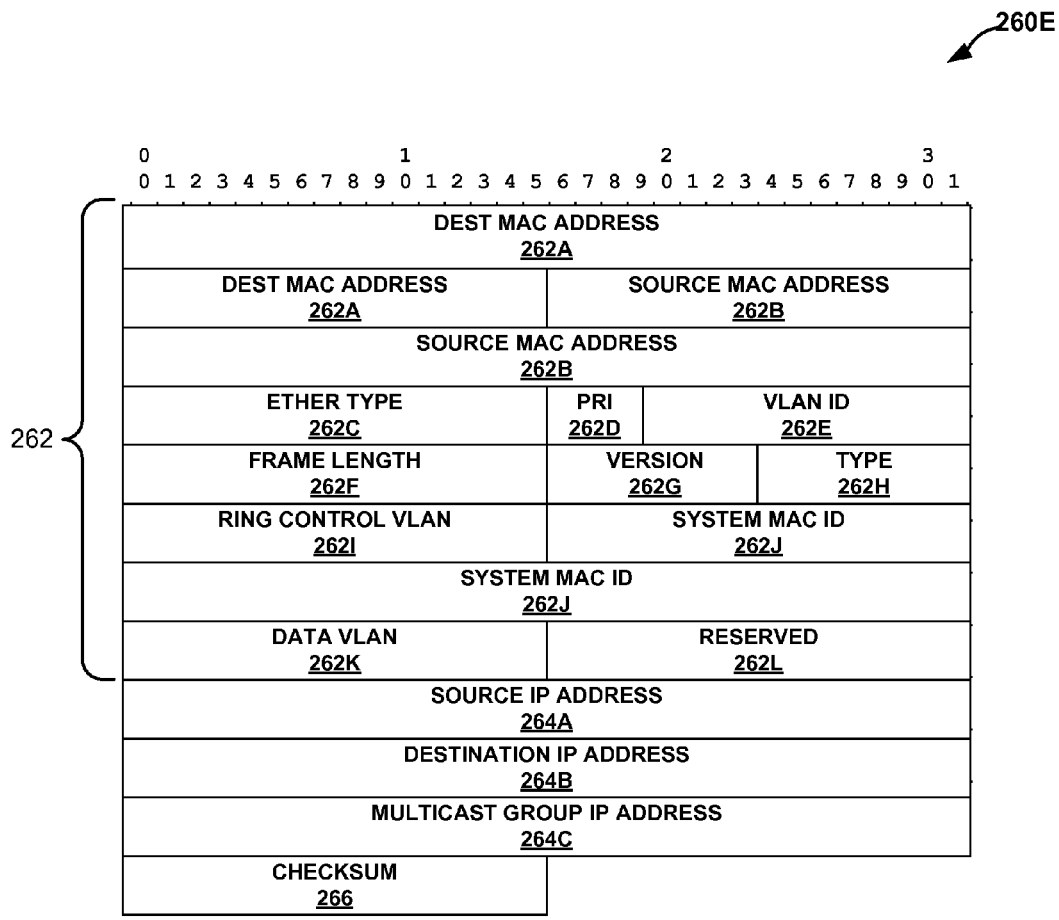

FIGS. 7A-7E are block diagrams illustrating various example messages 260A-260E formed in accordance with the group management ring protocol described in this disclosure. FIG. 7A is a block diagram illustrating an example join ring message 260A. FIG. 7B is a block diagram illustrating an example leave ring message 260B. FIG. 7C is a block diagram illustrating an example source-specific multicast report ring message 260C. FIG. 7D is a block diagram illustrating an example query ring message 260D. FIG. 7E is a block diagram illustrating an example router announce message 260E.

Referring first to the example of FIG. 7A, join ring message 26A includes a header 262 that defines a number of fields 262A-262L, which are each labeled to reflect the data stored to each of these fields but not explicitly labeled as fields in any of the examples of FIG. 7A-7E for ease of illustration purposes. Header 262 is generally common to all of messages 260A-260E and, for this reason, is only described with respect to join ring message 260A and thereafter it is assumed that header 262 for other messages 260B-260E is substantially similar to header 262 described with respect to join ring message 260A.

As noted above, header 262 includes a number of fields 262A-262L. Destination media access control (MAC) address field 262A represents a field to store a destination MAC address associated with the ring network GMRP, which in some instances is a MAC address of 00 02 5D 1C 8D 1B in hexadecimal. Source MAC address field 262B represents a field to store a source MAC address of the ring port sending message 260A. Ether type field 262C represents a field to store a type of Ethernet message, which is commonly set to 0x8100$_{16}$. Priority field 262D ("PRI 262D") represents a field to store VLAN priority bits.

VLAN ID field 262E represents a field to store a control VLAN identifier that identifies the control VLAN over which this message is sent. Frame length field 262F represents a field to store the so-called over length in octets of the message. Protocol version field 262G ("version 262G") represents a field to store a version of GMRP. Type field 262H represents a field to store a type of the message, where a value of 0x01 indicates a router announce message type, 0x02 indicates a V1/V2 join ring message type, 0x03 indicates an SSM ring message type, 0x04 indicates a query ring message type and 0x05 indicates a leave ring message type. Ring control VLAN ID 262I represents a field to store a control VLAN ID. Generally, ring control VLAN ID 262I is set to the same value as VLAN ID field 262, but they may be set to different values in certain contexts that may be unrelated to the techniques described in this disclosure. System MAC ID field 262J represents a field to store a MAC address of the originating ring node. Data VLAN field 262K represents a field to store a data VLAN of the IGMP multicast group being managed.

Join ring message 260A also includes three fields 264A-264C in what is commonly referred to as the payload of message 260A, as well as a checksum field 266, which all messages 260A-260E generally include to provide some amount of data verification. Source IP address field 264A represents a field to store a source IP address of the corresponding IGMP join request. Destination IP address field 264B represents a field to store a multicast address of the multicast group that is being joined. Multicast group IP address field 264C represents a field to store a multicast address of the multicast group that is being joined.

Referring to the example of FIG. 7B, leave ring message 260B includes header 262 and a checksum field 266 as well as payloads fields 264A-264C, which are substantially similar to fields 264A-264C of join ring message 260A. The only difference between these two messages 260A, 260B is that join ring message 260A includes a type field 262H with a value of 0x02 while leave ring message 260B includes a type field 262H with a value of 0x05. Given this change in type, GMRP modules interpret the values stored to fields 264A-264C differently such that multicast group IP address 264C identifies the multicast group is being left by the source IP address stored to source IP address field 264A.

Referring to the example of FIG. 7C, SSM report ring message 260C represents a message used for a third version of IGMP commonly denoted as IGMPv3. In IGMPv3, join and leave messages have been replaced with a common SSM report message. SSM report ring message 260C mirrors this functionality on a ring-wide basis so as to facilitate the appearance of ring network 10 as a snooping bridge or switch with respect to IGMPv3. More information regarding SSM messages and IGMPv3 can be found in RFC 3376, entitled "Internet Group Management Protocol, Version 3," dated October 2002, the entire contents of which are hereby incorporated by references as if set forth in its entirety in this disclosure. While described above with respect to IGMPv2 messages, the techniques may be implemented to accommodate IGMPv3 or even IGMPv1 messages for the purposes of presenting ring network 10 as a single network device to external devices.

SSM report ring message 260C includes header 262 and payload fields 268A-268R. Source IP address field 268A represents a field that stores the source IP address of the SSM report message that triggered the SSM report ring message 260C. Destination IP address field 268B represents a field that stores a destination IP address of any IGMPv3 capable multicast router. Number of group records (M) field 268C indicates a variable number of group records that follow reserved field 268D. Each of group records fields 268E-268R store various information defining whether a given group should be joined or leaved. For example, each of group record fields 268E-268R store a record type, an auxiliary data length indicating whether to include, exclude, block, allow or exclude none of the groups, a number of source IP addresses, a multicast group IP address and the source IP addresses.

Referring to FIG. 7D, query ring message 260D includes a header 262, a checksum field 266 and payload fields 270A-270Z. Maximum response time field 270A represents a field that stores a time in one tenths of a second indicating a time to reply to query ring message 260D. Query operational version field 270B ("oper version 270B") represents a field that stores a version derived from the multicast router indicating the version of IGMP supported by the router. Using this version value, nodes 18, 20 may determine whether to send IGMPv2 join/leave ring messages or IGMPv3 SSM report ring messages. Query type field 270C represents a field that stores a query type, where a value of 0x0B indicates a general ring query, 0x0C indicates a group query ring message, 0x0D indicates a group source query ring message and 0x0# indicates a ring query ring message. Maximum response code field 270D ("max resp code 270D") represents a field that stores a value for a maximum response code that is derived from the multicast router, i.e., router 12 in the examples described above. S-bit/query robustness variable (QRV) field 270E ("S/QRV 270E") represents a field that stores an s-bit identifying whether to suppress router side processing and a router's QRV. Querying routers query interval count (QQIC) field 270F ("QQIC 270F") represents a field that stores a routers query interval count. Number of sources (N) field 270H represents a field that stores a variable number of sources expected for a group source query. Source IP address field 270I represents a field that stores a source IP address of the query requester. Destination IP address field 270J represents a field that stores an address associated with all hosts. Multicast group IP address 270K represents a field that stores the multicast address of the group that is being queried. If the query type stored to query type field 270C indicates that the query is a general query, this value stored to multicast group IP address 270K is set to zero. Source address fields 270M-270Z represents fields to store respective sources for a group source query in the form of IP addresses. In instances where the router is reporting an IGMP query operational version of 1 or 2, the fields of S/QRV, QQIC and number of sources have no meaning in IGMPv1 or v2 and therefore are set to zero.

Referring to the example of FIG. 7E, router announce message 260E includes a header 262, a checksum field 266 and payload fields 264A-264C, where the fields 262, 266 and 264 are substantially similar to those shown above with respect to join ring message 260A and leave ring message 260B. Generally, router announce message 260E is used to inform ring network 10 that a multicast capable router has arrived or departed form a given control ring, as denoted by the control VLAN and the data VLANs controlled by the control VLAN. Generally, the only difference between these messages 260A, 260B and router announce message 260E is a field that is usually an octet in length indicating whether or not the router is arriving or departing ring network 10. This field is not shown in the example of FIG. 7E for ease of illustration purposes. In any event, various ones of nodes 18, 20 may connect to an adjacent network device that provide access to multicast content and announce their arrival or departure from ring network 10 using router announce message 260E.

The techniques described in this disclosure may be implemented, at least in part, in hardware, software, firmware or any combination thereof. For example, various aspects of the described techniques may be implemented within one or more processors, including one or more microprocessors, digital signal processors (DSPs), network processors (NPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate computing hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:

1. A method comprising:

receiving, with one of a plurality of ring network devices configured in a ring topology to form a ring network, ring messages from one or more of the other ring network devices in accordance with a group management ring protocol, wherein the ring messages indicate operations requested by one or more host devices with respect to delivery of content of a multicast group, and wherein the one or more host devices are coupled to the ring network devices; and presenting, with the one of the ring network devices, the requested operations to an adjacent network device such that, from the perspective of the adjacent network device, the ring network appears as a single layer two network device, wherein the one of the ring network devices couples directly to the adjacent network device, and wherein the adjacent network device provides access to the content of the multicast group;

wherein receiving ring messages comprises receiving a join ring message requesting to join the multicast group, wherein the method further comprises generating a join message based on the join ring message so that the join message appears to originate from one of the one or more host devices, and wherein presenting the received operations comprises forwarding the generated join message to the adjacent ring network device so that, from the perspective of the adjacent ring network device, the single layer two network devices appears to forward the join message to the adjacent ring network device.

2. The method of claim 1, wherein the group management ring protocol is configured to operate within a ring topology protocol, the method further comprising:
blocking a port included within the one of the ring network devices to prevent traffic loops;
detecting a fault in the ring network;
unblocking the blocked port included within the one of the ring network devices in response to detecting the fault in the ring network to reconfigure the ring network; and
while detecting the fault and reconfiguring the ring network by unblocking the blocked port, receiving and forwarding the content of the multicast group around the ring network without requiring the one or more host devices coupled to the ring network devices to re-join the multicast group.

3. The method of claim 1, further comprising:
receiving, after joining the multicast group on behalf of the ring network, the content of the multicast group; and
forwarding the received content of the multicast group around the ring network such that the one of the ring network devices that sent the join ring message requesting to join the multicast group receives the content of the multicast group.

4. The method of claim 1, further comprising:
receiving a join message in accordance with an Internet group management protocol (IGMP) requesting to join the multicast group from one of the one or more host devices coupled to the one of the plurality of ring network devices;
determining whether the content of the multicast group is already being delivered around the ring network;
in response to a determination that the content of the multicast group is not already being delivered around the ring network, forwarding the received join message to the adjacent network device;
generating a join ring message in accordance with a group management ring protocol (GMRP) to indicate to the remaining ones of the plurality of ring network devices that the ring network has joined the multicast group; and
forwarding the join ring message around the ring network.

5. The method of claim 1,
wherein receiving ring messages comprises receiving a leave ring message requesting to leave the multicast group,
wherein the method further comprises:
verifying the leave ring message to determine whether or not any of the one or more host devices coupled to the one of the plurality of ring network devices have since joined the multicast group; and
generating a leave message in response to verifying the leave ring message based on the leave ring message,
wherein presenting the received operations comprises forwarding the leave message to the adjacent network device.

6. The method of claim 1, further comprising:
receiving a leave message in accordance with a Internet group management protocol (IGMP) requesting to leave the multicast group from one of the one or more host devices coupled to the one of the plurality of ring network devices;
determining whether other of the one or more host devices coupled to the remaining ones of the plurality of ring network devices are joined to the multicast group;
in response to a determination that none of the other host devices are joined to the multicast group, forwarding the received leave message to the adjacent network device;
generating an leave ring message in accordance with a group management ring protocol (GMRP) to indicate to the remaining ones of the plurality of ring network devices that the ring network has left the multicast group; and
forwarding the leave ring message around the ring network.

7. The method of claim 1, further comprising:
receiving an Internet group management protocol (IGMP) membership query message from the adjacent network device requesting that the one or more host devices coupled to the single L2 network device provide a status with respect to their respective memberships to the multicast group;
generating a query ring message in accordance with a group management ring protocol (GMRP) to query each of the remaining ones of the ring network devices with regard to the status of the respective one or more host devices coupled to the each of the remaining plurality of ring network devices with respect to their respective memberships to the multicast group;
forwarding the generated query ring message around the ring network;
receiving GMRP join ring messages from one or more of the remaining plurality of ring network devices indicating that those of the one or more host devices coupled to these one or more of the remaining plurality of ring network devices are currently members of the multicast group; and
generating an IGMP join message based on the GMRP join ring message,
wherein presenting the received operations comprises outputting the generated IGMP join message to the adjacent network device.

8. The method of claim 1, wherein the adjacent network device comprises a router.

9. A method comprising:
storing, with one of a plurality of ring network devices configured in a ring topology to form a ring network, data identifying at least one multicast group to which the ring network has joined, wherein the one of the plurality of ring network devices is indirectly coupled to an adjacent network device via one or more of the remaining plurality of ring network devices;
receiving, with the one of the plurality of ring network devices, a ring message in accordance with a group management ring protocol (GMRP) implemented by each of the plurality of ring network devices so as to present the ring network as the single layer two network device to the adjacent network device;
performing, with the one of a plurality of ring network devices, operations in response to the ring message so as to enable each of the plurality of ring network device to present the ring network as a single layer two network device to the adjacent network device;
receiving a join message, the join message requesting to join a multicast group, from a host device coupled to the one of the plurality of ring network devices;
determining whether the content of the multicast group is already being delivered around the ring network;
in response to a determination that the content of the multicast group is not already being delivered around the ring network, generating a join ring message in accordance with GMRP to indicate to the remaining ones of the plurality of ring network devices that the ring network is joining the multicast group; and forwarding the join ring message around the ring network.

10. The method of claim 9,
wherein receiving a ring message comprises receiving a GMRP join ring message indicating that the ring network has joined a multicast group; and
wherein performing operation comprises updating the data identifying the at least one multicast group to which the ring network has joined to add the multicast group indicated by the GMRP join ring message so that content of the multicast group indicated by the GMPR join message is forwarded around the ring network to each of the plurality of ring network devices.

11. The method of claim 9,
wherein receiving a ring message comprises receiving a GMRP leave ring message indicating that the ring network is leaving one of the at least one multicast group stored by the one of the plurality of ring network devices, and
wherein performing operation comprises:
generating an Internet group management protocol (IGMP) group query message based on the GMRP leave ring message to query host devices coupled to the one of the plurality of ring network devices with regard to a status of each of these host devices with respect to their respective memberships to the one of the at least one multicast groups indicated in the GMRP leave ring message;
receiving at least one IGMP join message in response to the IGMP group query message indicating that at least one of these host devices are currently joined to the one of the at least one multicast groups identified in the GMRP leave ring message;
generating an GMRP join ring message in response to receiving the at least one IGMP join message; and
outputting the GMRP join ring message around the ring network.

12. The method of claim 9,
wherein receiving a ring message comprises receiving a GMRP leave ring message indicating that the ring network is leaving one of the at least one multicast groups stored by the one of the plurality of ring network devices, and
wherein performing operation comprises:
generating an Internet group management protocol (IGMP) group query message based on the GMRP leave ring message to query host devices coupled to the one of the plurality of ring network devices with regard to a status of each of these host devices with respect to their respective memberships to the one of the at least one multicast groups indicated in the GMRP leave ring message;
starting a timer upon sending the IGMP group query message;
upon the timer expiring, updating the data to remove the one of the at least one multicast groups indicated in the IGMP leave message from the data.

13. The method of claim 9, further comprising:
receiving an Internet group management protocol (IGMP) leave message from a host device coupled to the one of the plurality of ring network devices indicating that the host device has left one of the at least one multicast groups;
determining whether other host devices coupled to the remaining ones of the plurality of ring network devices are joined to the one of the at least one multicast groups;
in response to a determination that none of the other host devices are joined to the multicast group, generating a leave ring message in accordance with a group management ring protocol (GMRP) to indicate to the remaining ones of the plurality of ring network devices that the ring network has left the multicast group;
outputting the leave ring message around the ring network; and
updating the data to remove the one of the at least one multicast groups indicated in the IGMP leave message from the data.

14. The method of claim 9,
wherein receiving a ring message comprises receiving a GMRP query ring message requesting a status for each host device coupled to the one of the plurality of ring network devices with respect to their respective memberships to at least one multicast group identified by the GMRP query ring message, and
wherein performing operation comprises:
generating an Internet group management protocol (IGMP) query message based on the GMRP query ring message to query the host devices coupled to the one of the plurality of ring network devices with regard to the status of each of these host devices with respect to their respective memberships to the at least one multicast groups identified in the GMRP query ring message;
receiving at least one IGMP join message in response to the IGMP query message indicating that at least one of these host devices are currently joined to the one of the at least one multicast groups identified in the GMRP query ring message;
generating an GMRP join ring message based on the IGMP join message in response to receiving the at least one IGMP join message; and
outputting the GMRP join ring message around the ring network.

15. The method of claim 9, wherein the adjacent network device comprises a router.

16. A ring network device directly coupled to an adjacent network device that provides access to content of a multicast group, the ring network device comprising:
at least one port that receives ring messages from one or more other ring network devices in accordance with a group management ring protocol, wherein the ring messages indicate operations requested by one or more host devices with respect to delivery of content of the multicast group, wherein the one or more host devices are coupled to the plurality of ring network devices, and wherein the ring network device comprises one of a plurality of ring network devices that are configured in a ring topology to form a ring network; and
a control unit that presents the received operations to the adjacent network device such that, from the perspective of the adjacent network device, the ring network appears as a single layer two network device;
wherein the ring network device receives a join ring message requesting to join the multicast group,
wherein the control unit includes:
a group management ring protocol (GMRP) module that generates a join message based on the join ring message so that the join message appears to originate from one of the one or more host devices, and
a group management protocol (GMP) module that forwards the generated join message to the adjacent network device so that, from the perspective of the adjacent network device, the single layer two network devices appears to forward the join message to the adjacent network device.

17. The ring network device of claim 16,
wherein the group management ring protocol is configured to operate within a ring topology protocol,
wherein the at least one port comprises a primary port and a secondary port, and
wherein the control unit comprises a ring management protocol (RMP) module that blocks the secondary port to prevent traffic loops, detects a fault in the ring network and unblocks the blocked secondary port in response to detecting the fault in the ring network, and
wherein the at least one port, while the RMP module detects the fault and reconfigures the ring network by unblocking the blocked port, receives and forwards the content of the multicast group around the ring network without requiring the one or more host devices coupled the ring network devices to re-join the multicast group despite the occurrence of the detected fault.

18. The ring network device of claim 16,
wherein the at least one port receives, after the GMP module joins the multicast group on behalf of the ring network, the content of the multicast group, and
wherein the GMRP module forwards the received content of the multicast group around the ring network such that the one of the plurality of ring network devices that sent the join message requesting to join the multicast group receives the content of the multicast group.

19. The ring network device of claim 16,
wherein the at least one port receives a join message in accordance with an Internet group management protocol (IGMP) requesting to join the multicast group from one of the one or more host devices coupled to the one of the plurality of ring network devices;
wherein the control unit includes a group management ring protocol (GMRP) module that determines whether the content of the multicast group is already being delivered around the ring network,
wherein the GMRP module, in response to a determination that the content of the multicast group is not already being delivered around the ring network, forwards the received join message to the adjacent network device, and generates a join ring message in accordance with a group management ring protocol (GMRP) to indicate to the remaining ones of the plurality of ring network devices that the ring network has joined the multicast group, and
wherein the at least one port forwards the join ring message around the ring network.

20. The ring network device of claim 16,
wherein the at least one port receives a leave ring message requesting to leave the multicast group,
wherein the control unit includes:
a group management ring protocol (GMRP) module that verifies the leave ring message to determine whether or not any of the one or more host devices coupled to the one of the plurality of ring network devices have since joined the multicast group; and
a group management protocol (GMP) module that generates a leave message in response to the GMRP module verifying the leave ring message based on the leave ring message and forwards the leave message to the adjacent network device.

21. The ring network device of claim 16,
wherein the at least one port receives a leave message in accordance with a Internet group management protocol (IGMP) requesting to leave the multicast group from one of the one or more host devices coupled to the one of the plurality of ring network devices;
wherein the control unit includes:
an IGMP module that determines whether other of the one or more host devices coupled to the remaining ones of the plurality of ring network devices are joined to the multicast group, and in response to a determination that none of the other host devices are joined to the multicast group, forwards the received leave message to the adjacent network device; and
a group management ring protocol (GMPR) module that generates an leave ring message in accordance with a group management ring protocol (GMRP) to indicate to the remaining ones of the plurality of ring network devices that the ring network has left the multicast group,
wherein the at least one port forwarding the leave ring message around the ring network.

22. The ring network device of claim 16,
wherein the at least one port receives an Internet group management protocol (IGMP) membership query message from the adjacent network device requesting that the one or more host devices coupled to the single L2 network device provide a status with respect to their respective memberships to the multicast group;
wherein the control unit includes a group management ring protocol (GMRP) module that generates a query ring message in accordance with a group management ring protocol (GMRP) to query each of the remaining ones of the ring network devices with regard to the status of the respective one or more host devices coupled to the each of the remaining plurality of ring network devices with respect to their respective memberships to the multicast group,
wherein the at least one port forwards the generated query ring message around the ring network and receives GMRP join ring messages from one or more of the remaining plurality of ring network devices indicating that those of the one or more host devices coupled to these one or more of the remaining plurality of ring network devices are currently members of the multicast group; and
wherein the control unit includes an IGMP module that generates an IGMP join message based on the GMRP join ring message, and
wherein the at least one port outputs the generated IGMP join message to the adjacent network device.

23. The ring network device of claim 16, wherein the adjacent network device comprises a router.

24. A ring network device indirectly coupled to an adjacent network device that provides access to content of a multicast group, the ring network device comprising:
a control unit that stores data identifying at least one multicast group to which the ring network has joined, wherein the ring network device is one of a plurality of ring network devices, and wherein the ring network device is indirectly coupled to the adjacent network device via one or more of the remaining plurality of ring network devices; and
at least one port that receives a ring message in accordance with a group management ring protocol (GMRP) implemented by each of the plurality of ring network devices so as to present the entire ring network as the single layer two network device to the adjacent network device,
wherein the control unit performs operations in response to the ring message so as to enable each of the plurality of ring network devices to present the entire ring network as a single layer two network device to the adjacent network device;

wherein the ring network device receives a join message from a host device coupled to the ring network device, wherein the control unit includes a GMRP module that determines whether the content of the multicast group is already being delivered around the ring network and in response to a determination that the content of the multicast group is not already being delivered around the ring network, generates a join ring message in accordance with GMRP to indicate to the remaining ones of the plurality of ring network devices that the ring network is joining the multicast group, and wherein the at least one port forwards the join ring message around the ring network.

25. The ring network device of claim 24,
wherein the at least one port receives a GMRP join ring message indicating that the ring network has joined a multicast group; and wherein the control unit includes a GMRP module that updates the data identifying the at least one multicast group to which the ring network has joined to add the multicast group indicated by the GMRP join ring message so that content of the multicast group indicated by the GMPR join message is forwarded around the ring network to each of the plurality of ring network devices.

26. The ring network device of claim 24,
wherein the at least one port receives a GMRP leave ring message indicating that the ring network is leaving one of the at least one multicast groups stored by the one of the plurality of ring network devices, and wherein the control unit includes:

an Internet group management protocol (IGMP) module that generates an IGMP group query message based on the GMRP leave ring message to query host devices coupled to the one of the plurality of ring network devices with regard to a status of each of these host devices with respect to their respective memberships to the one of the at least one multicast groups indicated in the GMRP leave ring message, receives at least one IGMP join message in response to the IGMP group query message indicating that at least one of these host devices are currently joined to the one of the at least one multicast groups identified in the GMRP leave ring message; and a GMRP module that generates an GMRP join ring message in response to receiving the at least one IGMP join message, wherein the at least one port outputs the GMRP join ring message around the ring network.

27. The ring network device of claim 24,
wherein the at least one port receives a GMRP leave ring message indicating that the ring network is leaving one of the at least one multicast groups stored by the one of the plurality of ring network devices, and wherein the control unit includes an Internet group management protocol (IGMP) module that generates an IGMP group query message based on the GMRP leave ring message to query host devices coupled to the one of the plurality of ring network devices with regard to a status of each of these host devices with respect to their respective memberships to the one of the at least one multicast groups indicated in the GMRP leave ring message, start a timer upon sending the IGMP group query message and upon the timer expiring, updating the data to remove the one of the at least one multicast groups indicated in the IGMP leave message from the data.

28. The ring network device of claim 24,
wherein the at least one port receives an Internet group management protocol (IGMP) leave message from a host device coupled to the one of the plurality of ring network devices indicating that the host device has left one of the at least one multicast groups, wherein the control unit includes a GMRP module that determines whether other host devices coupled to the remaining ones of the plurality of ring network devices are joined to the one of the at least one multicast groups, and in response to a determination that none of the other host devices are joined to the multicast group, generating a leave ring message in accordance with a group management ring protocol (GMRP) to indicate to the remaining ones of the plurality of ring network devices that the ring network has left the multicast group, wherein the at least one port outputs the leave ring message around the ring network, and wherein the control unit includes an IGMP module that updates the data to remove the one of the at least one multicast groups indicated in the IGMP leave message from the data.

29. The ring network device of claim 24,
wherein the at least one port receives a GMRP query ring message requesting a status for each host device coupled to the one of the plurality of ring network devices with respect to their respective memberships to at least one multicast group identified by the GMRP query ring message, and wherein the control unit includes an Internet group management protocol (IGMP) module that generates an IGMP query message based on the GMRP query ring message to query the host devices coupled to the one of the plurality of ring network devices with regard to the status of each of these host devices with respect to their respective memberships to the at least one multicast groups identified in the GMRP query ring message and receives at least one IGMP join message in response to the IGMP query message indicating that at least one of these host devices are currently joined to the one of the at least one multicast groups identified in the GMRP query ring message, wherein the control unit also includes a GMRP module that generates a GMRP join ring message based on the IGMP join message in response to receiving the at least one IGMP join message, and wherein the at least one port outputs the GMRP join ring message around the ring network.

30. The ring network device of claim 24, wherein the adjacent network device comprises a router.

31. An apparatus directly coupled to an adjacent network device that provides access to content of a multicast group, the apparatus comprising:

means for receiving ring messages from one or more other ring network devices of a plurality of ring network devices in accordance with a group management ring protocol, wherein the ring messages indicate operations requested by one or more host devices with respect to delivery of content of the multicast group, wherein the one or more host devices are coupled to the plurality of ring network devices, and wherein the apparatus comprises one of the plurality of ring network devices that are configured in a ring topology to form a ring network; and means for presenting the received operations to an adjacent network device only if the entire ring network has not joined the multicast group such that, from the perspective of the adjacent network device, the ring network appears as a single layer two network device.

32. An apparatus indirectly coupled to an adjacent network device that provides access to content of a multicast group via another ring network device in a ring network, the apparatus comprising:
means for storing data identifying at least one multicast group to which the ring network has joined, wherein the apparatus is one of a plurality of ring network devices, and wherein the apparatus is indirectly coupled to the adjacent network device via one or more of the remaining plurality of ring network devices;
means for receiving a ring message in accordance with a group management ring protocol (GMRP) implemented by each of the plurality of ring network devices so as to present the entire ring network as a single layer two network device to the adjacent network device,
means for performing operations in response to the ring message so as to enable each of the plurality of ring network device to present the entire ring network as a single layer two network device to the adjacent network device;
means for determining whether the content of the multicast group is already being delivered around the ring network and, in response to a determination that the content of the multicast group is not already being delivered around the ring network, for generating a join ring message in accordance with GMRP to indicate to the remaining ones of the plurality of ring network devices that the ring network is joining the multicast group, and
means for forwarding the join ring message around the ring network.

33. A non-transitory computer-readable storage medium comprising instructions for execution by a processor in one of a plurality of ring network devices configured in a ring topology to form a ring network, wherein the instructions are configured to cause the processor to:
receive ring messages from one or more of the other ring network devices in accordance with a group management ring protocol, wherein the ring messages indicate operations requested by one or more host devices with respect to delivery of content of a multicast group, and wherein the one or more host devices are coupled to the plurality of ring network devices;
present the received operations to an adjacent network device such that, from the perspective of the adjacent network device, the ring network appears as a single layer two network device, wherein the one of the plurality of network devices couples directly to the adjacent network device, and wherein the adjacent network device provides access to the content of the multicast group;
receive a join ring message requesting to join the multicast group,
generate a join message based on the join ring message so that the join message appears to originate from one of the one or more host devices, and
forward the generated join message to the adjacent ring network device so that, from the perspective of the adjacent ring network device, the single layer two network device appears to forward the join message to the adjacent ring network device.

34. The non-transitory computer-readable medium of claim 33,
wherein the group management ring protocol is configured to operate within a ring topology protocol, and
wherein the instructions further cause the processor to:
block a port included within the one of the ring network devices to prevent traffic loops;
detect a fault in the ring network;
unblock the blocked port included within the one of the ring network devices in response to detecting the fault in the ring network to reconfigure the ring network; and
while detecting the fault and reconfiguring the ring network by unblocking the blocked port, receive and forward the content of the multicast group around the ring network without requiring the one or more host devices coupled to the ring network devices to re-join the multicast group.

35. The non-transitory computer-readable medium of claim 33, wherein the instructions further cause the processor to:
receive, after joining the multicast group on behalf of the ring network, the content of the multicast group; and
forward the received content of the multicast group around the ring network such that the one of the ring network devices that sent the join ring message requesting to join the multicast group receives the content of the multicast group.

36. The non-transitory computer-readable medium of claim 33, wherein the instructions further cause the processor to:
receive a leave ring message requesting to leave the multicast group,
verify the leave ring message to determine whether or not any of the one or more host devices coupled to the one of the plurality of ring network devices have since joined the multicast group;
generate a leave message in response to verifying the leave ring message based on the leave ring message; and
forward the leave message to the adjacent network device.

37. The non-transitory computer-readable medium of claim 33, further comprising:
receiving an Internet group management protocol (IGMP) membership query message from the adjacent network device requesting that the one or more host devices coupled to the single L2 network device provide a status with respect to their respective memberships to the multicast group;
generating a query ring message in accordance with a group management ring protocol (GMRP) to query each of the remaining ones of the ring network devices with regard to the status of the respective one or more host devices coupled to the each of the remaining plurality of ring network devices with respect to their respective memberships to the multicast group;
forwarding the generated query ring message around the ring network;
receiving GMRP join ring messages from one or more of the remaining plurality of ring network devices indicating that those of the one or more host devices coupled to these one or more of the remaining plurality of ring network devices are currently members of the multicast group; and
generating an IGMP join message based on the GMRP join ring message,
wherein presenting the received operations comprises outputting the generated IGMP join message to the adjacent network device.

38. A non-transitory computer-readable storage medium comprising instructions for execution by a processor in one of a plurality of ring network devices configured in a ring topology to form a ring network, wherein the instructions are configured to cause the processor to:

store data identifying at least one multicast group to which the ring network has joined, wherein the one of the plurality of ring network devices is indirectly coupled to an adjacent network device via one or more of the remaining plurality of ring network devices;

receive a ring message in accordance with a group management ring protocol (GMRP) implemented by each of the plurality of ring network devices so as to present the entire ring network as the single layer two network device to the adjacent network device;

perform operations in response to the ring message so as to enable each of the plurality of ring network device to present the entire ring network as a single layer two network device to the adjacent network device;

receive a join message from a host device coupled to the one of the plurality of ring network devices;

determine whether the content of the multicast group is already being delivered around the ring network;

in response to a determination that the content of the multicast group is not already being delivered around the ring network, generate a join ring message in accordance with GMRP to indicate to the remaining ones of the plurality of ring network devices that the ring network is joining the multicast group; and forward the join ring message around the ring network.

39. The non-transitory computer-readable storage medium of claim 38, wherein the instructions cause the processor to:

receive a GMRP join ring message indicating that the ring network has joined a multicast group; and update the data identifying the at least one multicast group to which the ring network has joined to add the multicast group indicated by the GMRP join ring message so that content of the multicast group indicated by the GMPR join message is forwarded around the ring network to each of the plurality of ring network devices.

40. The non-transitory computer-readable storage medium of claim 38, wherein the instructions cause the processor to:

receive a GMRP leave ring message indicating that the ring network is leaving one of the at least one multicast groups stored by the one of the plurality of ring network devices;

generate an Internet group management protocol (IGMP) group query message based on the GMRP leave ring message to query host devices coupled to the one of the plurality of ring network devices with regard to a status of each of these host devices with respect to their respective memberships to the one of the at least one multicast groups indicated in the GMRP leave ring message;

start a timer upon sending the IGMP group query message;

upon the timer expiring, update the data to remove the one of the at least one multicast groups indicated in the IGMP leave message from the data.

41. The non-transitory computer-readable storage medium of claim 38, wherein the instructions cause the processor to:

receive an Internet group management protocol (IGMP) leave message from a host device coupled to the one of the plurality of ring network devices indicating that the host device has left one of the at least one multicast groups;

determine whether other host devices coupled to the remaining ones of the plurality of ring network devices are joined to the one of the at least one multicast groups;

in response to a determination that none of the other host devices are joined to the multicast group, generate a leave ring message in accordance with a group management ring protocol (GMRP) to indicate to the remaining ones of the plurality of ring network devices that the ring network has left the multicast group;

output the leave ring message around the ring network; and update the data to remove the one of the at least one multicast groups indicated in the IGMP leave message from the data.

42. The non-transitory computer-readable storage medium of claim 38, wherein the instructions cause the processor to:

receive a GMRP query ring message requesting a status for each host device coupled to the one of the plurality of ring network devices with respect to their respective memberships to at least one multicast group identified by the GMRP query ring message;

generate an Internet group management protocol (IGMP) query message based on the GMRP query ring message to query the host devices coupled to the one of the plurality of ring network devices with regard to the status of each of these host devices with respect to their respective memberships to the at least one multicast groups identified in the GMRP query ring message;

receive at least one IGMP join message in response to the IGMP query message indicating that at least one of these host devices are currently joined to the one of the at least one multicast groups identified in the GMRP query ring message;

generate an GMRP join ring message based on the IGMP join message in response to receiving the at least one IGMP join message; and output the GMRP join ring message around the ring network.

43. A network system comprising:

a plurality of ring network devices configured in a ring topology to form a ring network;

an adjacent network device coupled to one of the plurality of ring network devices that is external from the ring network, wherein the adjacent network device provides access to content of a multicast group; and one or more host devices coupled to one or more of the plurality of ring network devices that are external from the ring network, wherein the one of the plurality of ring network devices directly coupled to the adjacent network device comprises:

at least one port that receives ring messages from one or more other ring network devices in accordance with a group management ring protocol (GMRP), wherein the ring messages indicate operations requested by one or more host devices with respect to delivery of content of the multicast group; and a control unit that presents the received operations to the adjacent network device such that, from the perspective of the adjacent network device, the ring network appears as a single layer two network device, and wherein each of the other ring network devices that indirectly couple to the adjacent network device comprise:

a control unit that stores data identifying at least one multicast group to which the ring network has joined; and at least one port that receives the ring messages in accordance with the group management ring protocol (GMRP) implemented by each of the plurality of ring network devices so as to present the entire ring network as the single layer two network device to the adjacent network device, wherein the control unit of the indirectly coupled ring network devices performs other operations in response to the ring messages so as to enable each of the plurality of ring network devices to present the entire ring network as a single layer two network device to the adjacent network device.

* * * * *